Nov. 1, 1932.　　　　W. E. LIPPERT　　　　1,885,525
PUBLIC SERVICE BILLING MACHINE
Filed March 25, 1927　　21 Sheets-Sheet 1
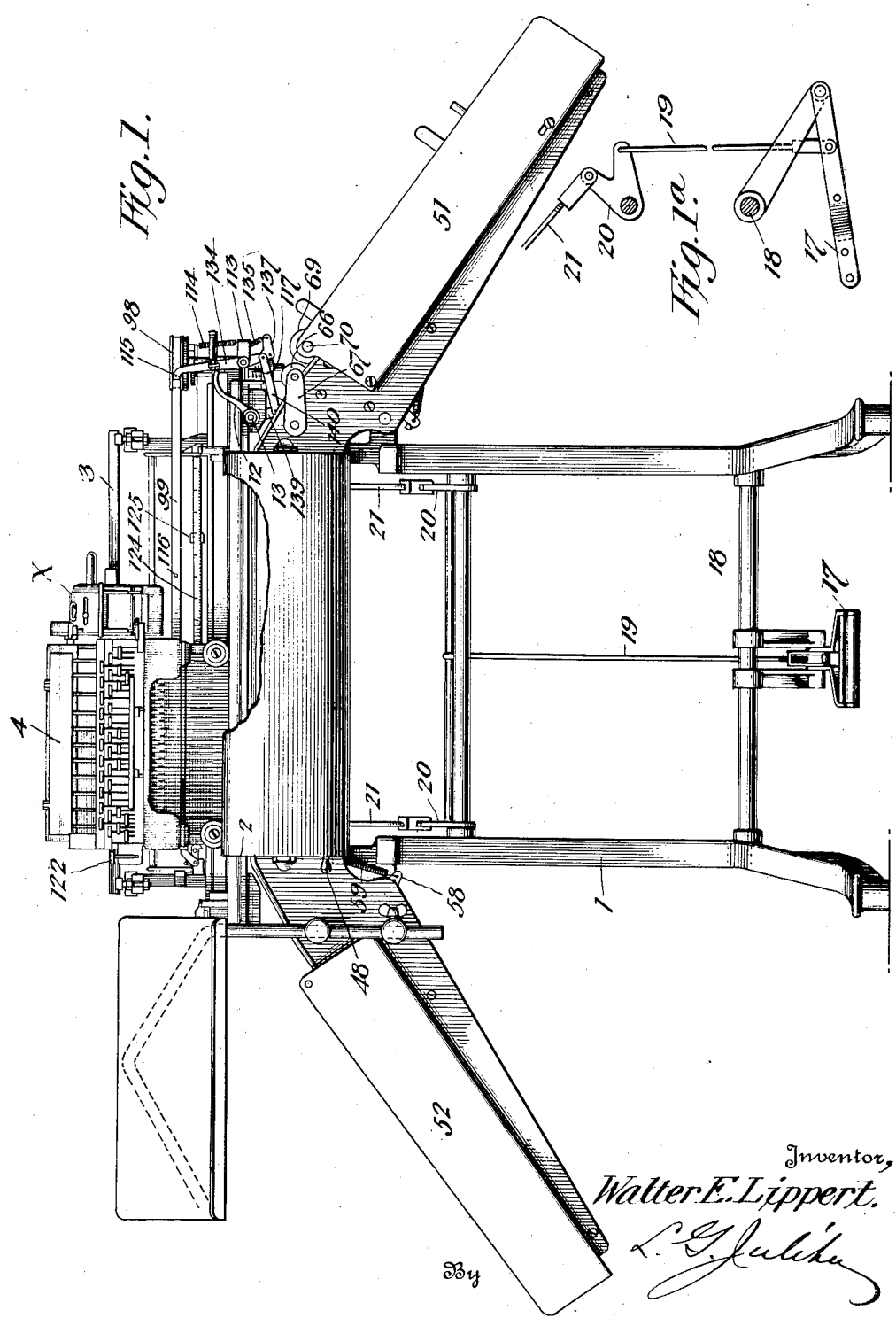
Inventor,
Walter E. Lippert.
By
Attorney

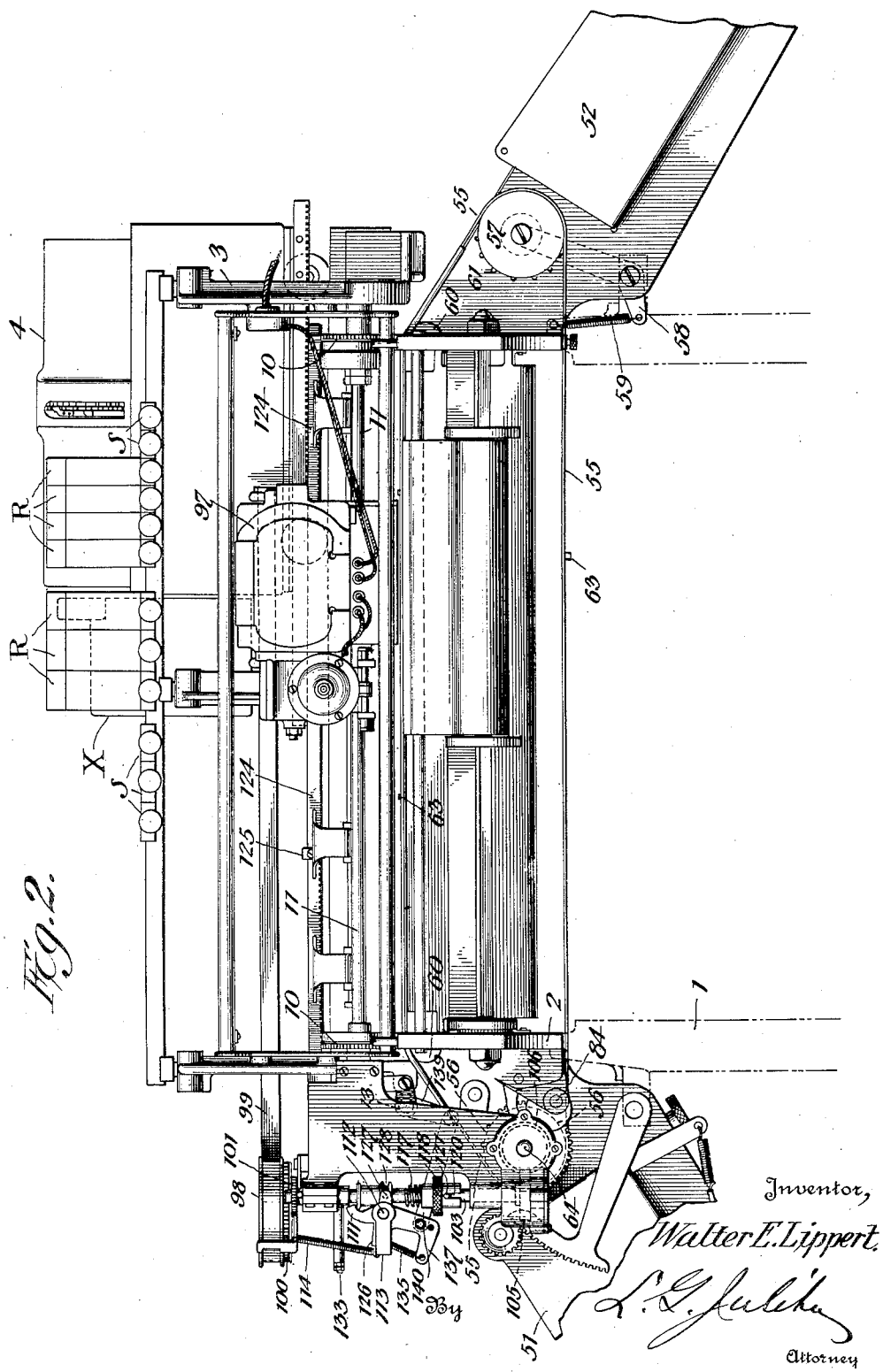

Nov. 1, 1932.      W. E. LIPPERT      1,885,525
PUBLIC SERVICE BILLING MACHINE
Filed March 25, 1927    21 Sheets-Sheet 3
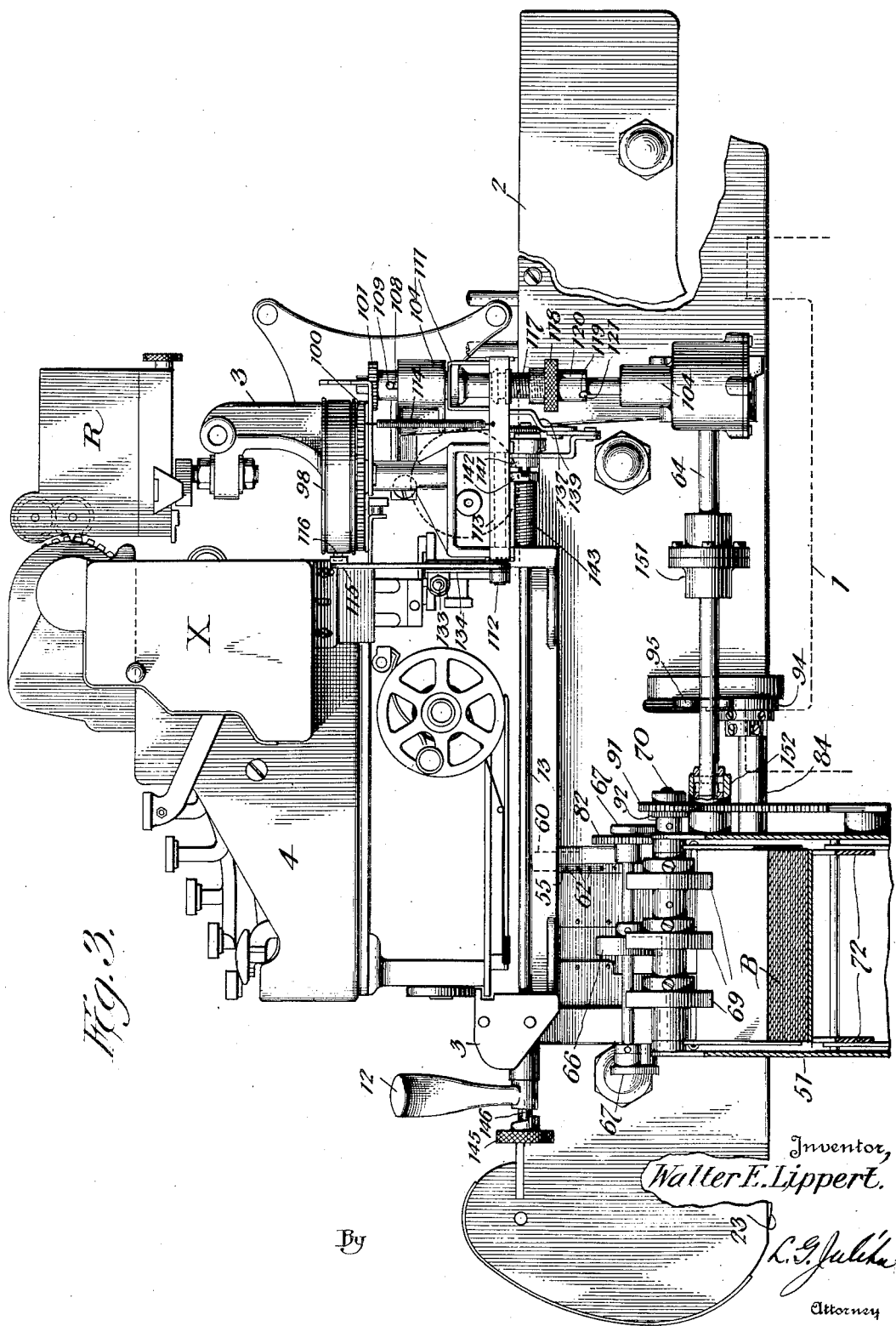

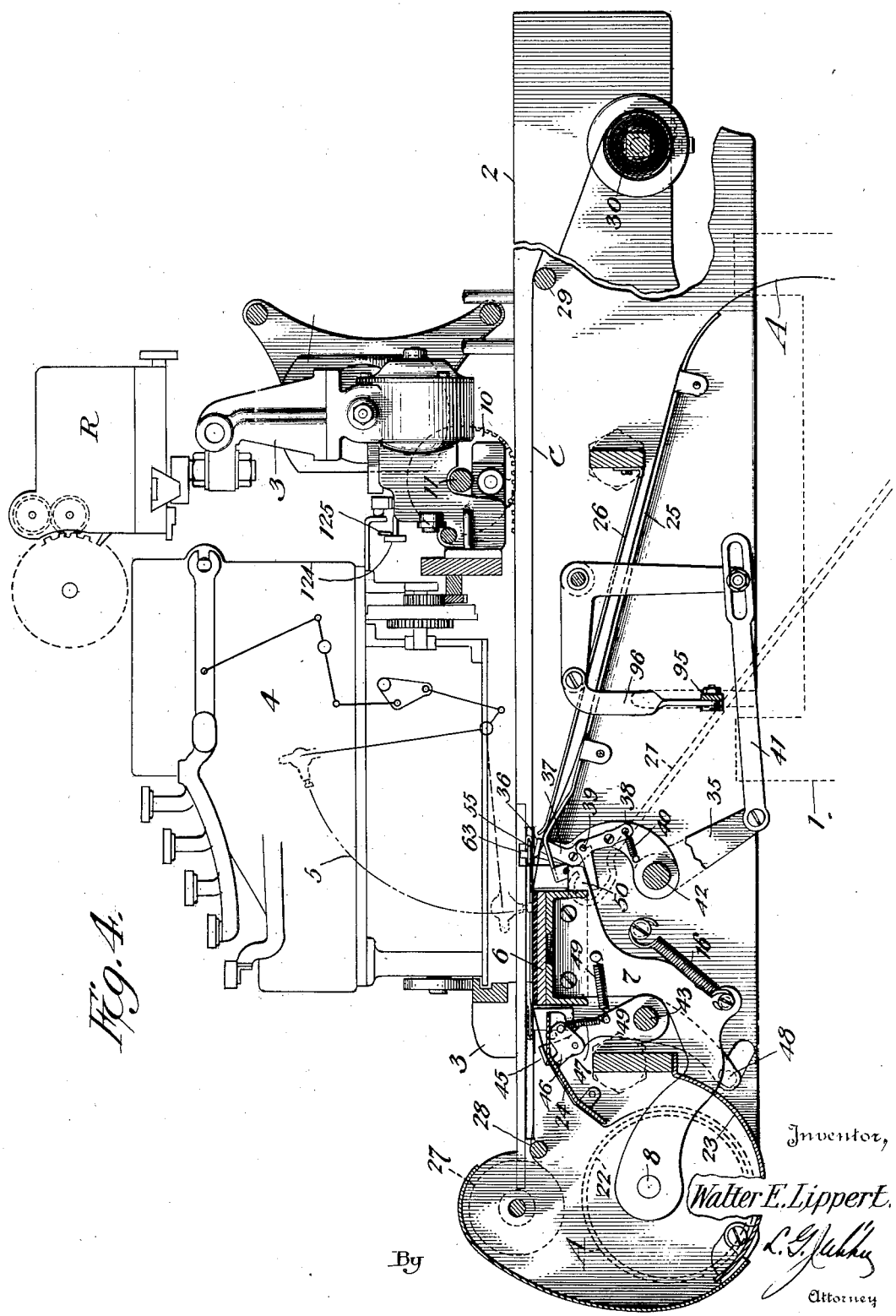

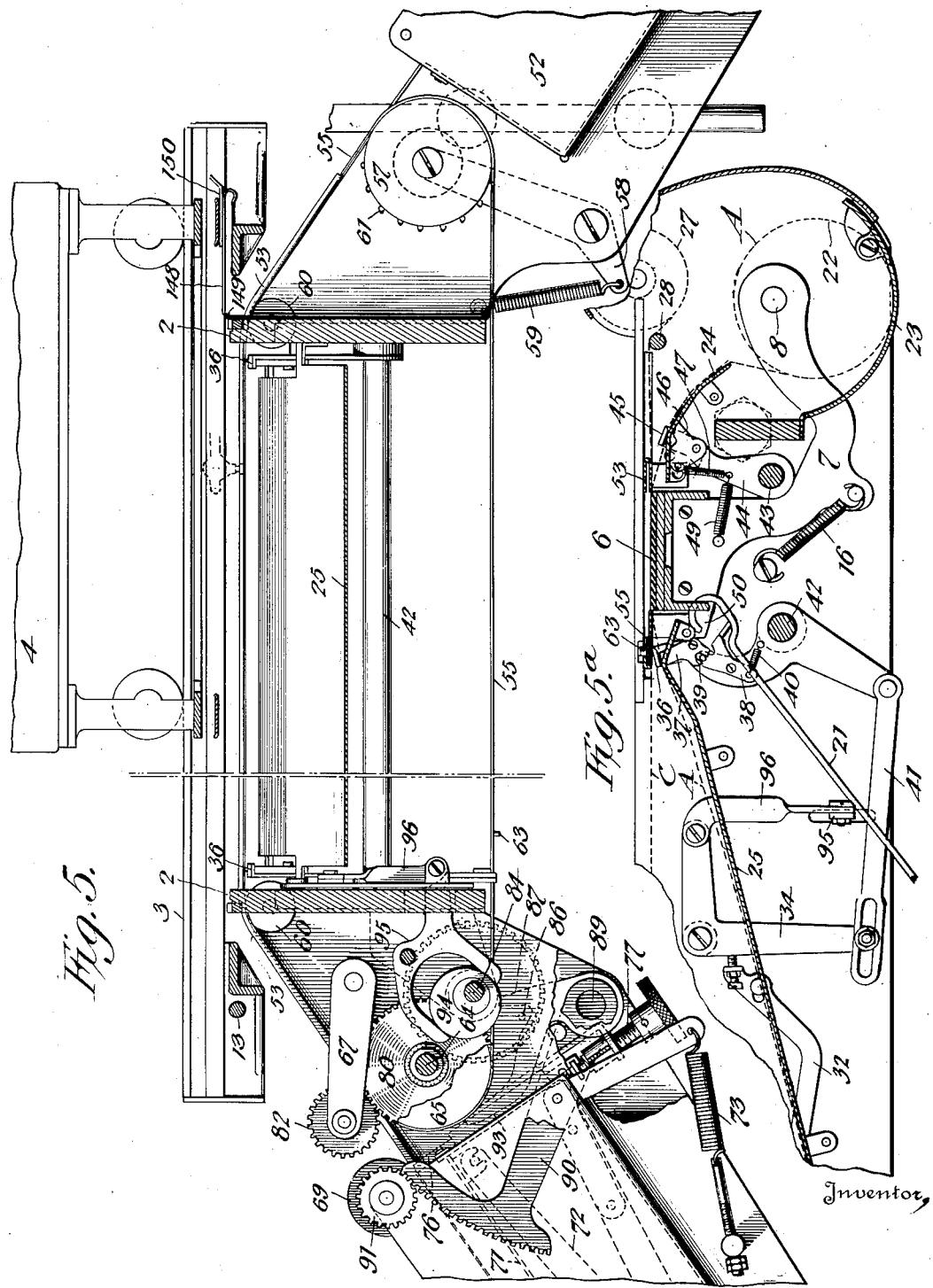

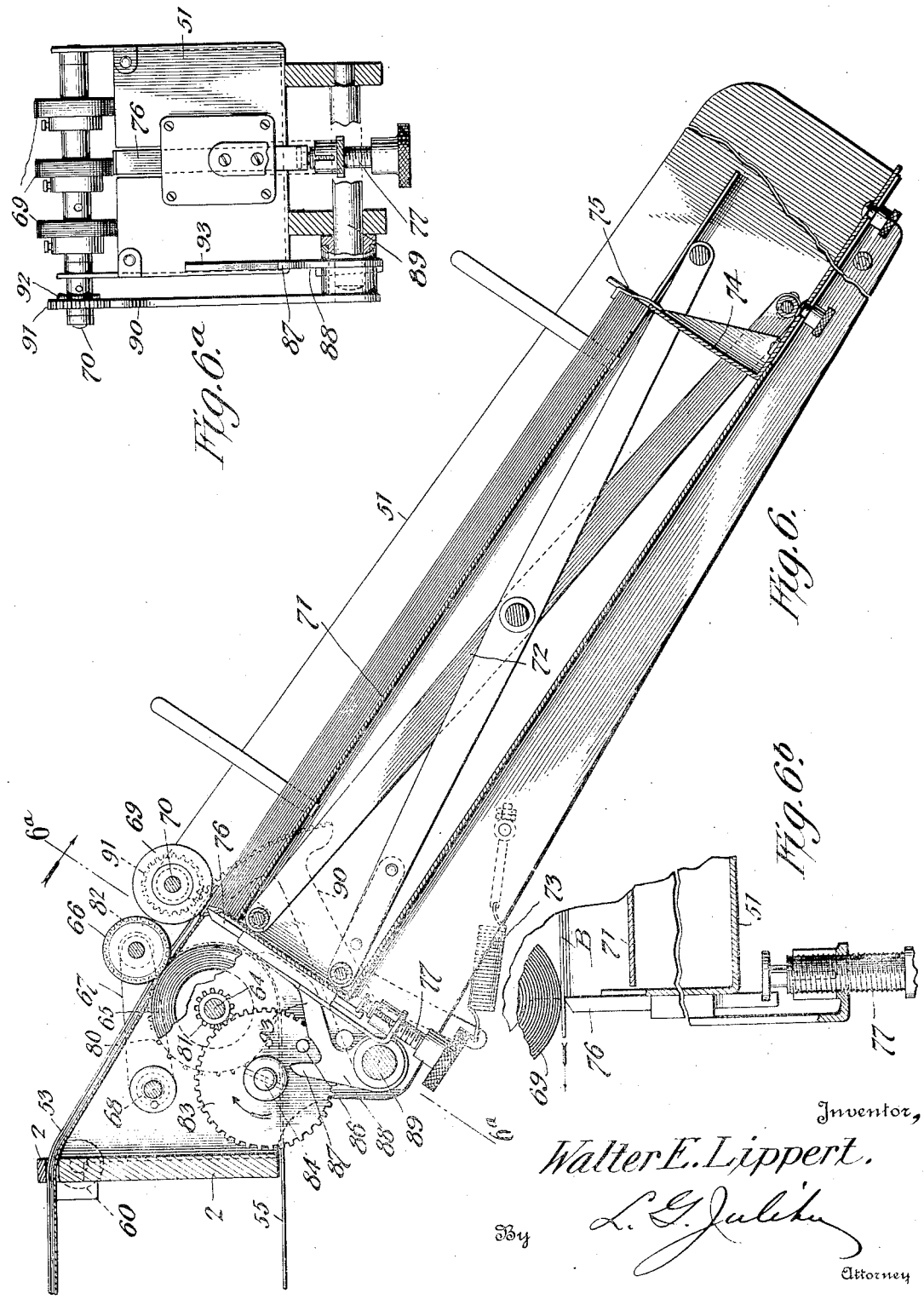

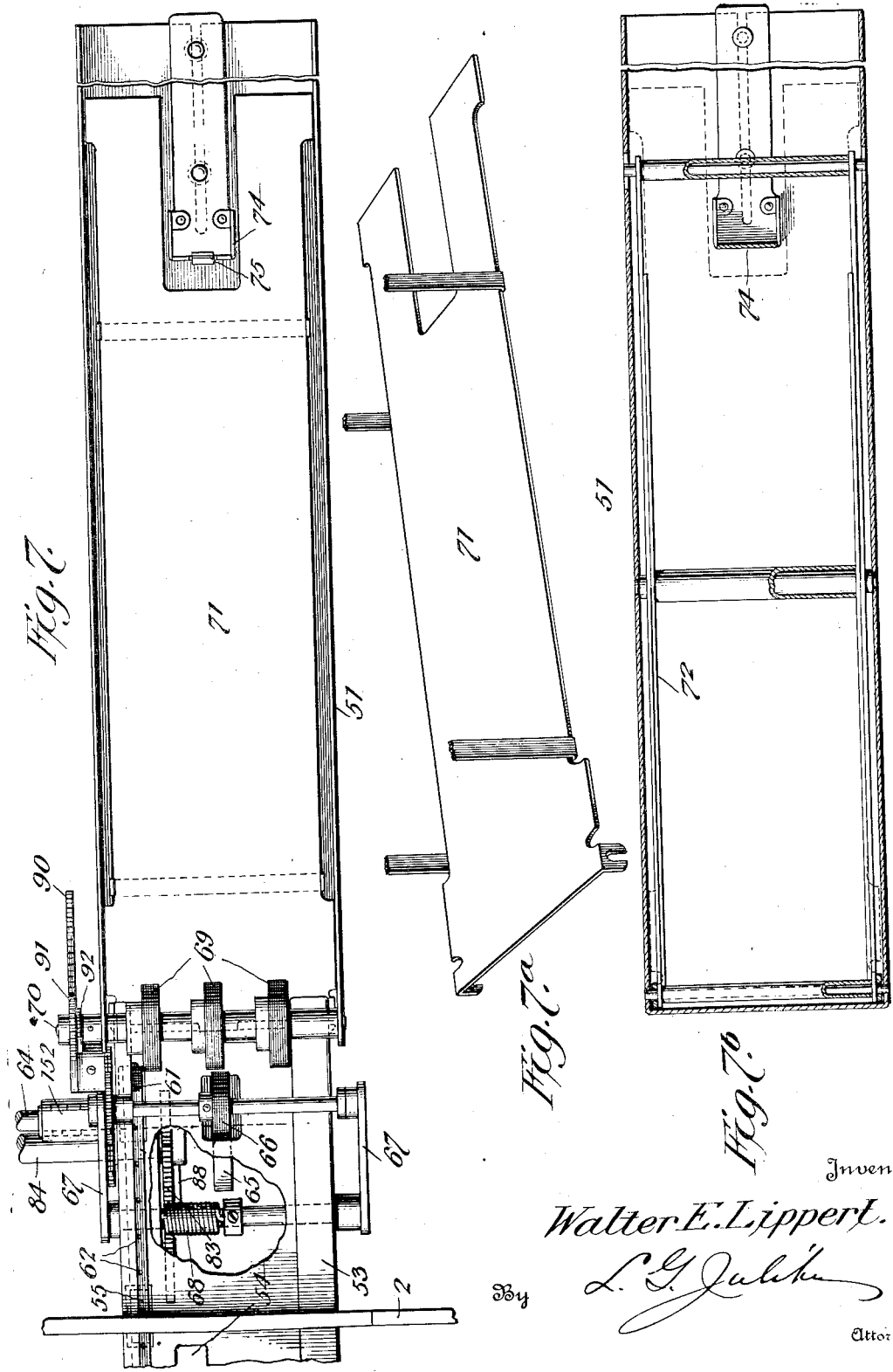

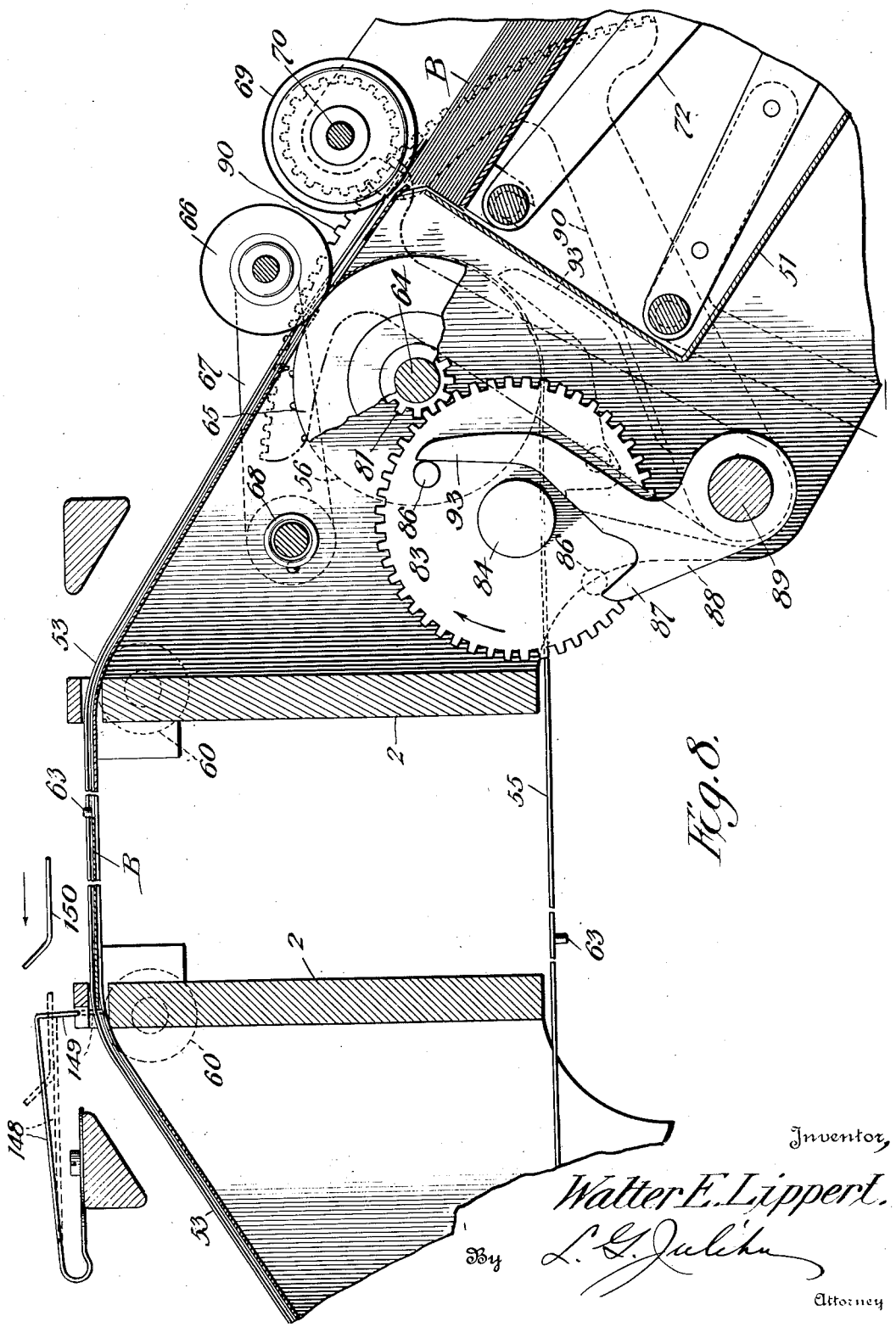

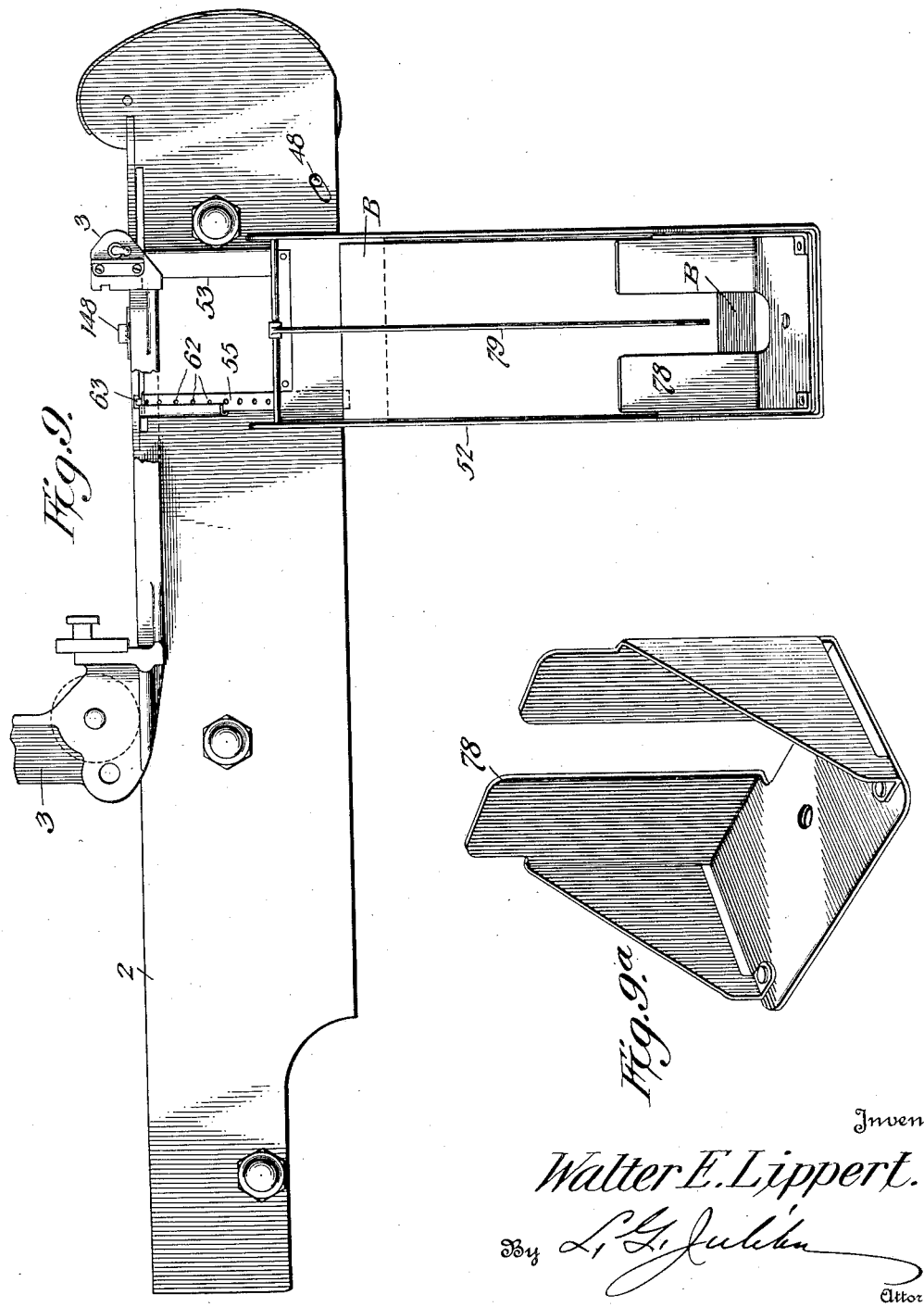

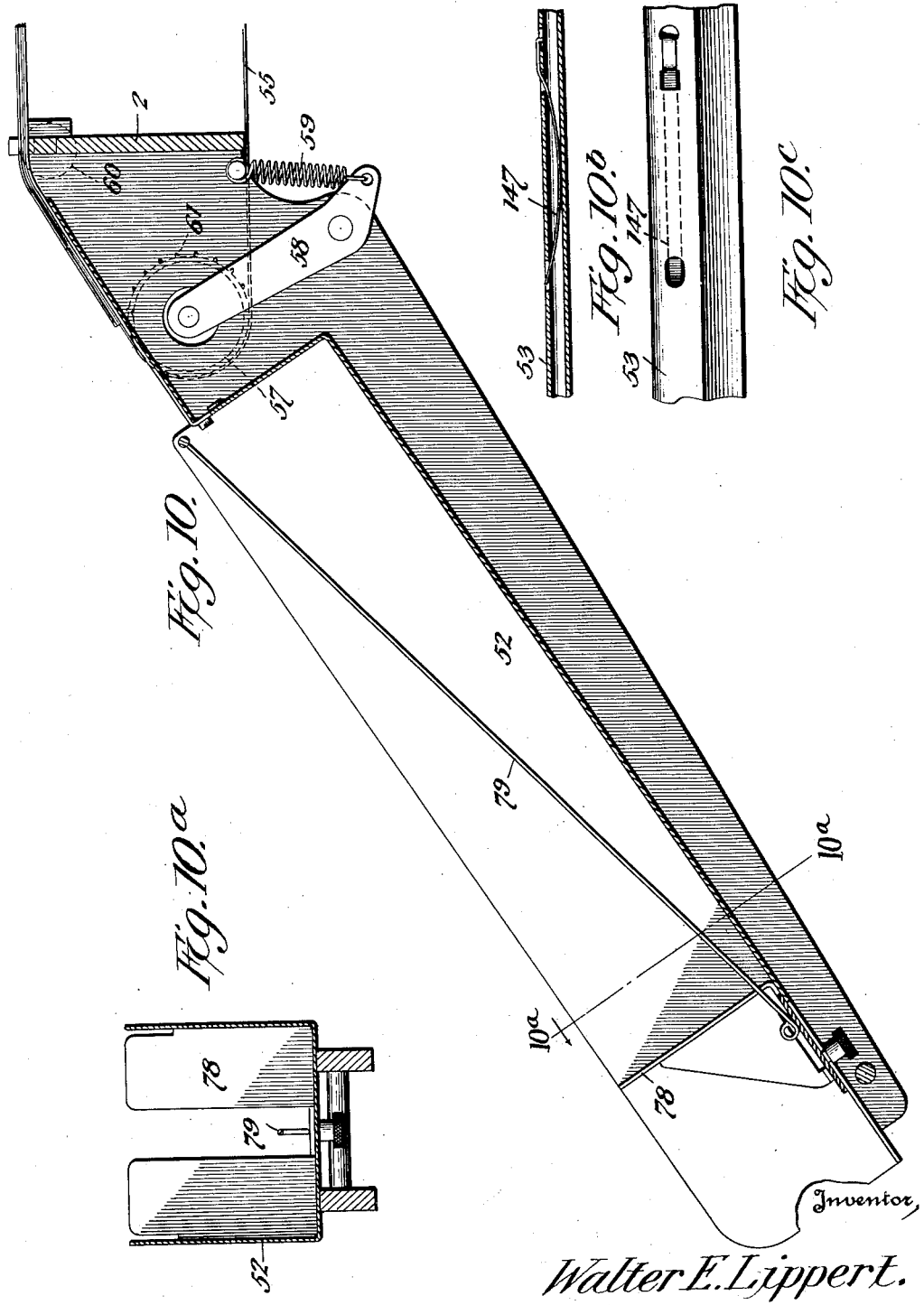

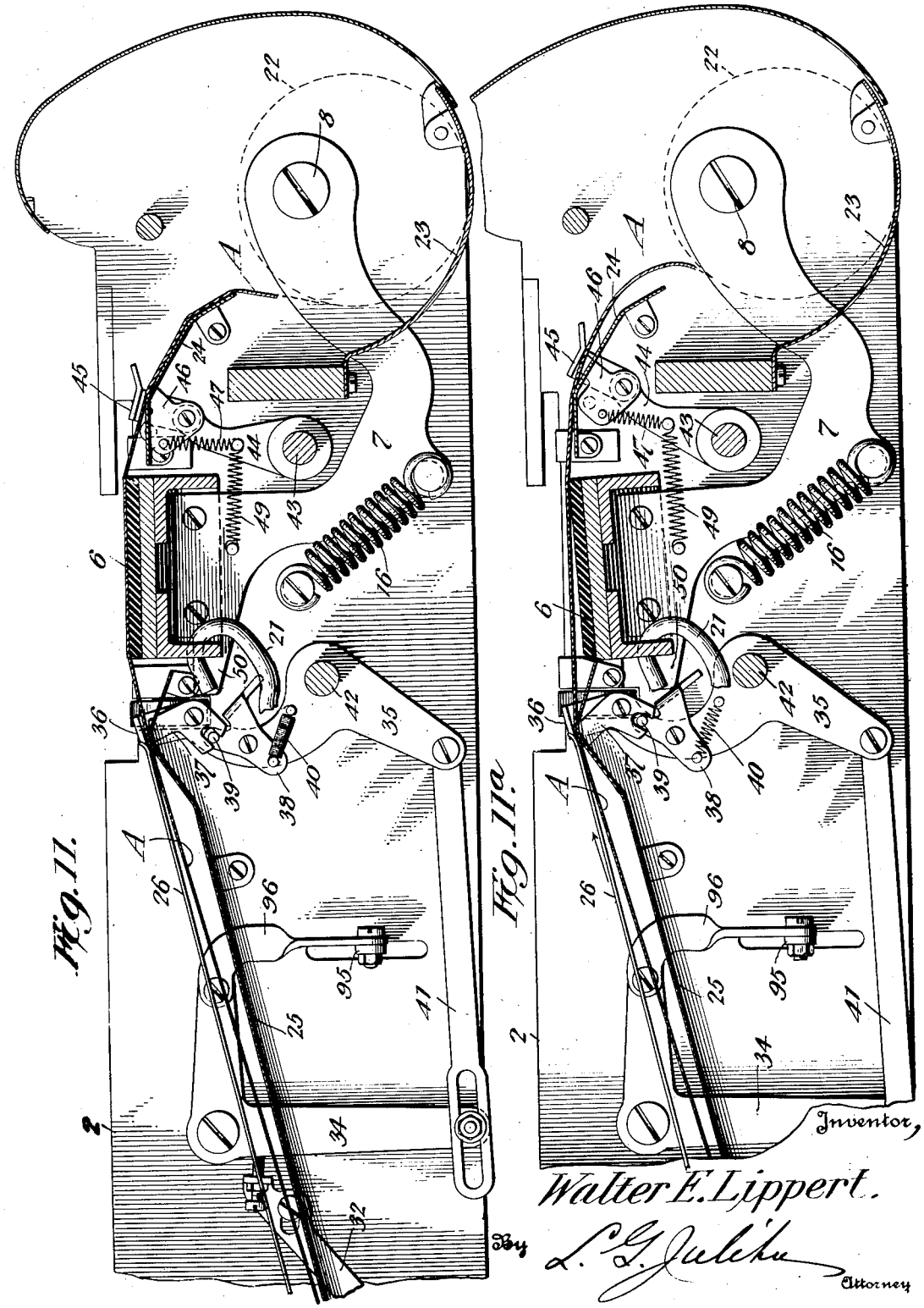

Nov. 1, 1932.  W. E. LIPPERT  1,885,525
PUBLIC SERVICE BILLING MACHINE
Filed March 25, 1927   21 Sheets-Sheet 12
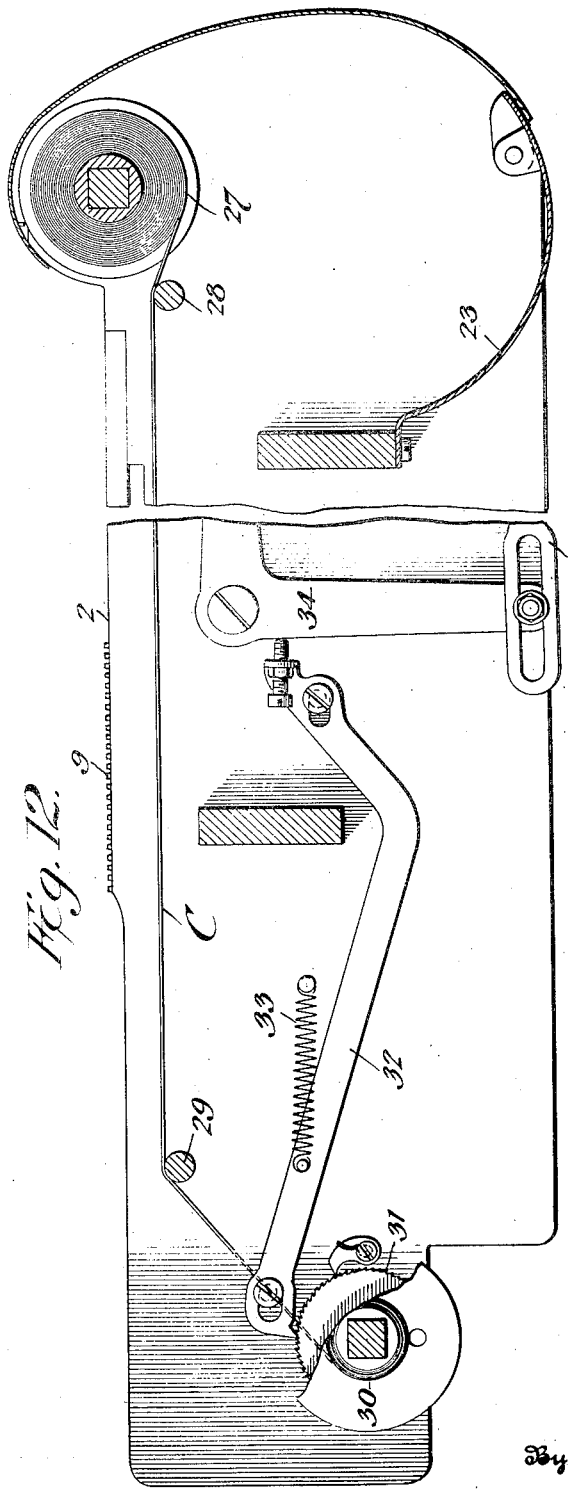
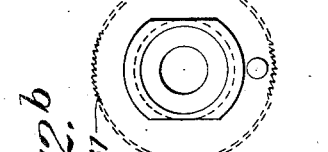
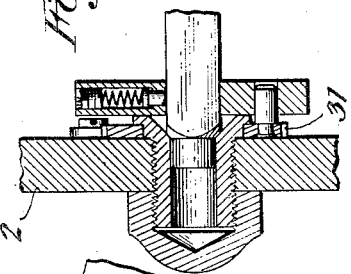
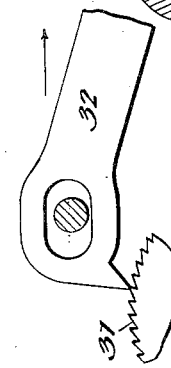
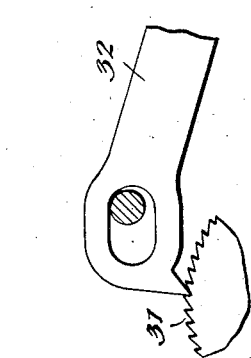
Inventor,
Walter E. Lippert.
By L. G. Julihn
Attorney

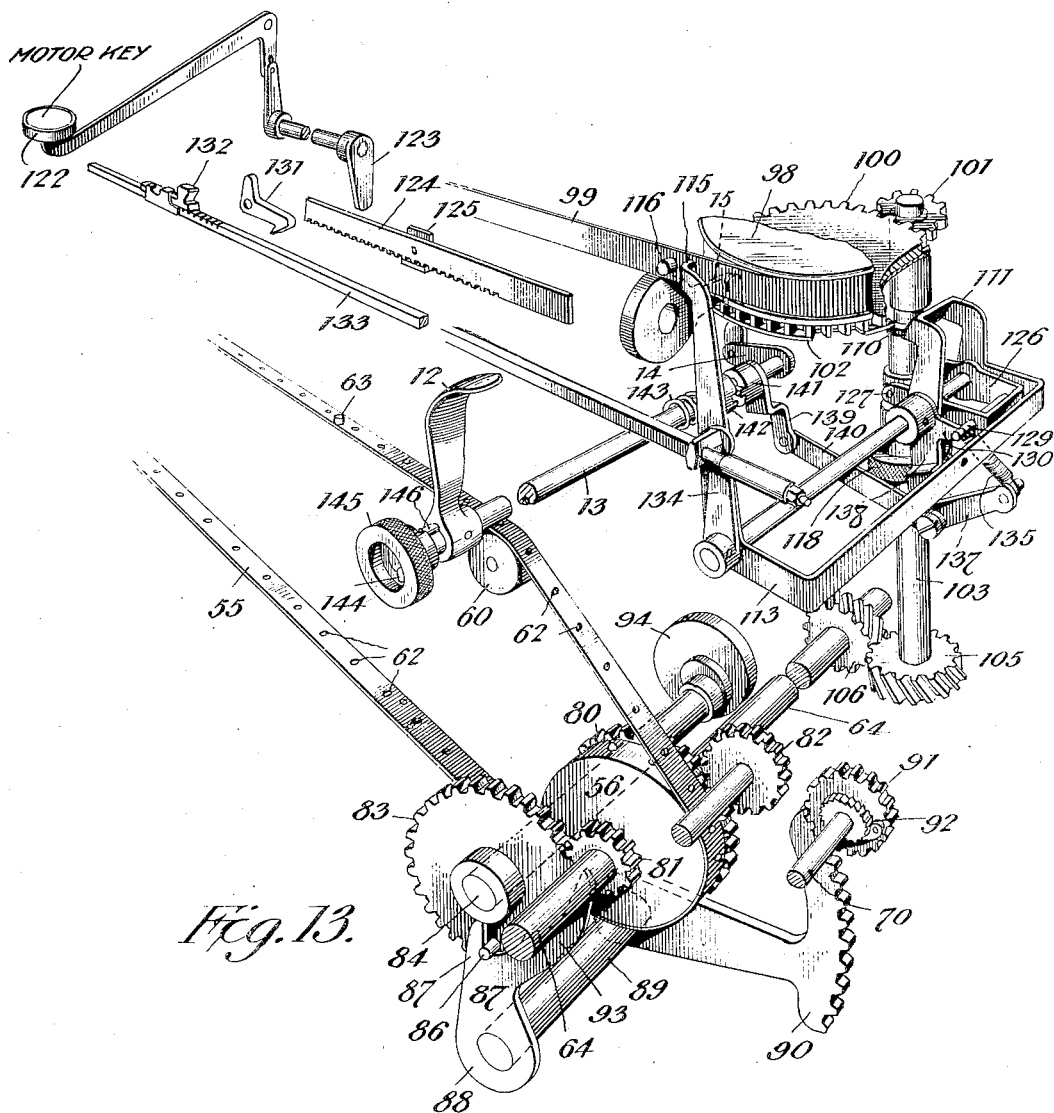

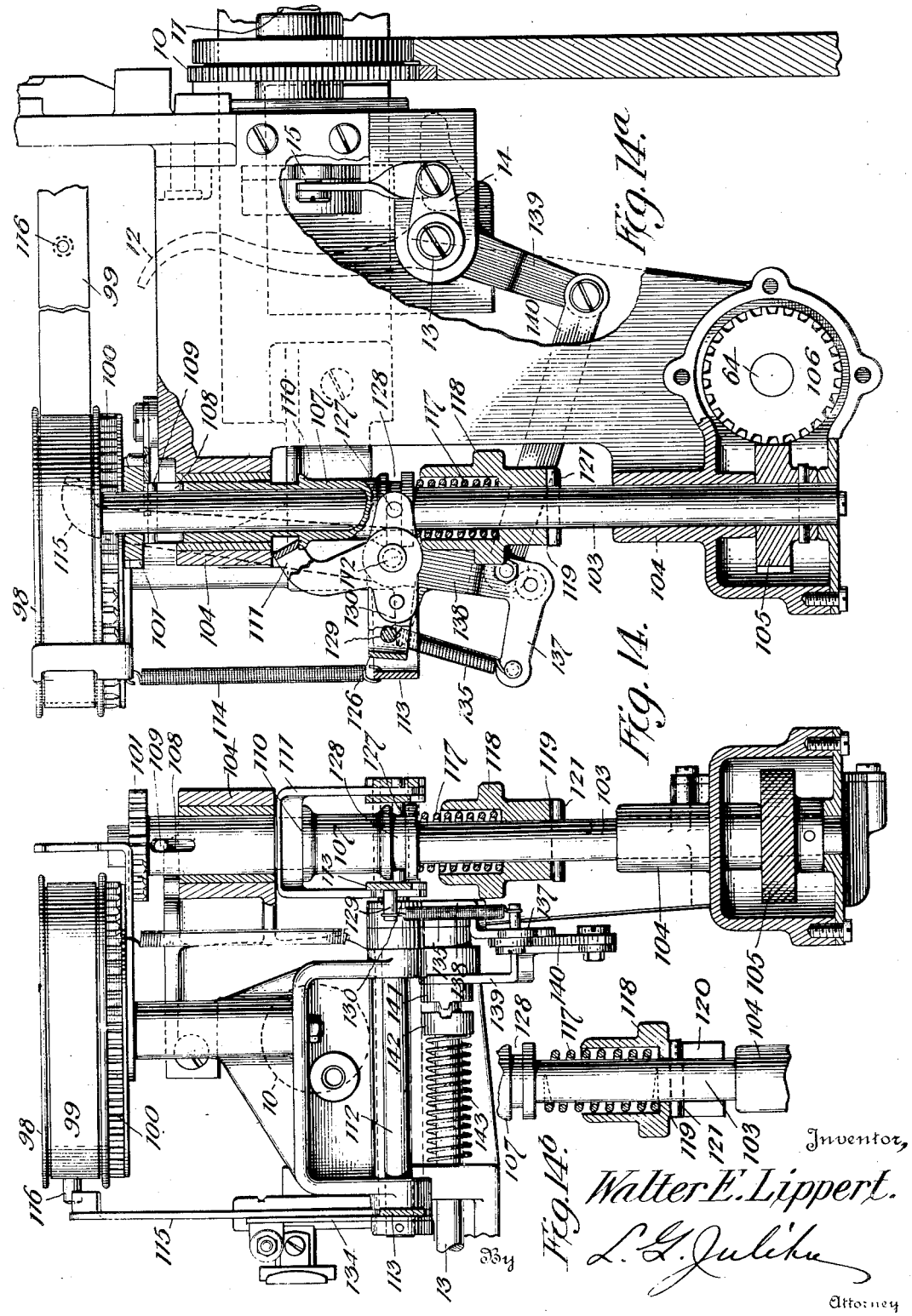

Nov. 1, 1932.   W. E. LIPPERT   1,885,525
PUBLIC SERVICE BILLING MACHINE
Filed March 25, 1927    21 Sheets-Sheet 15
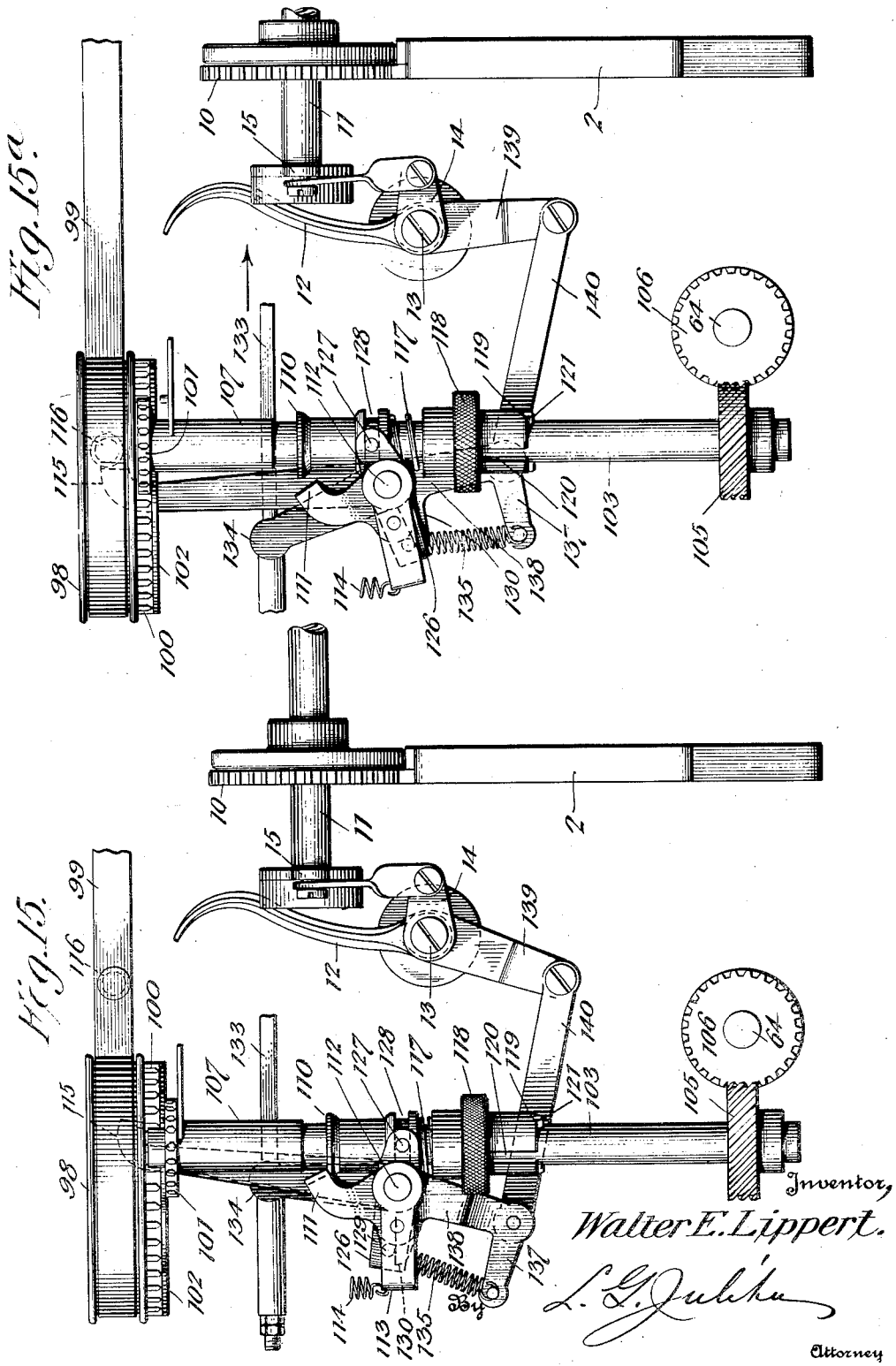
Inventor,
Walter E. Lippert.
Attorney

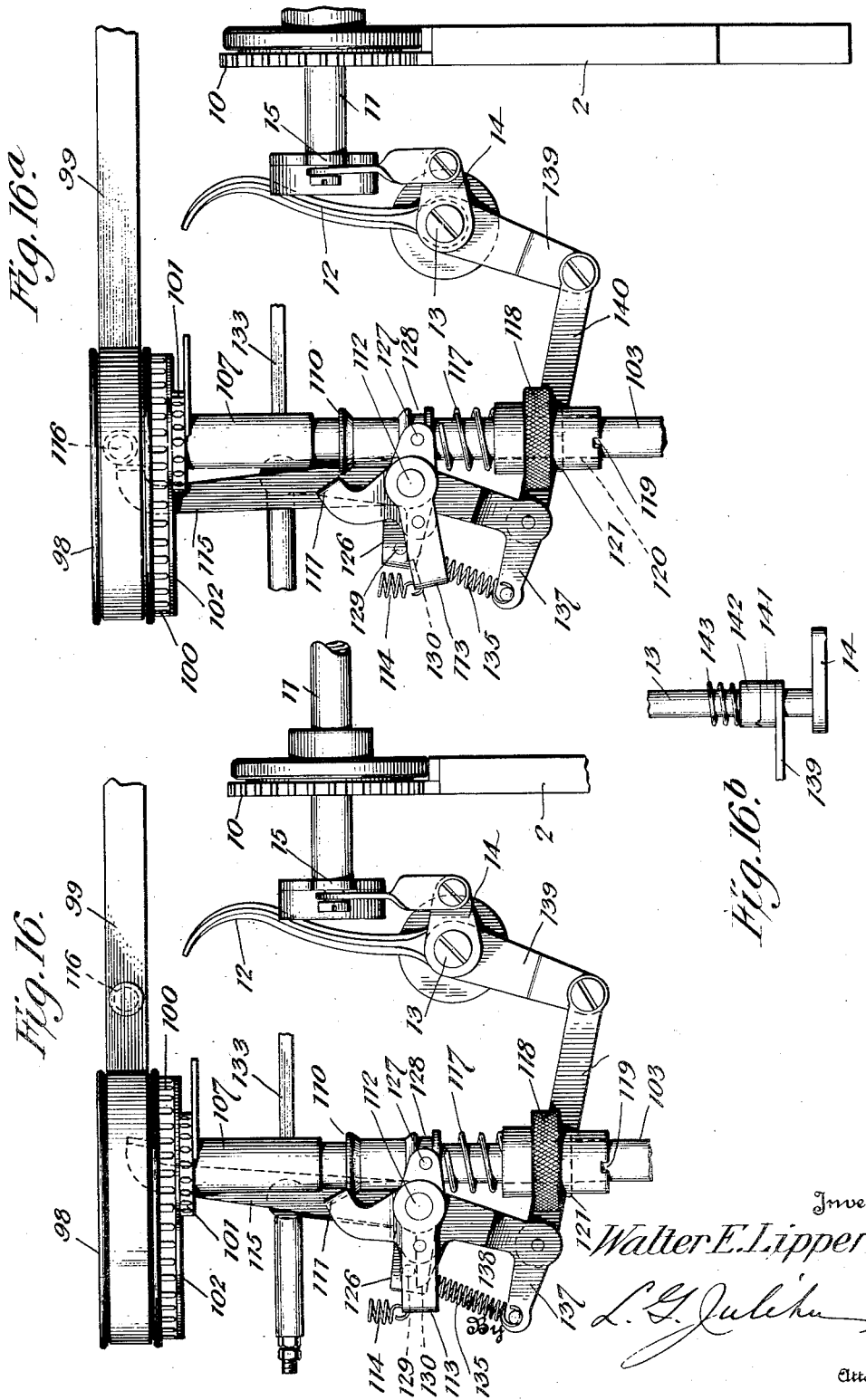

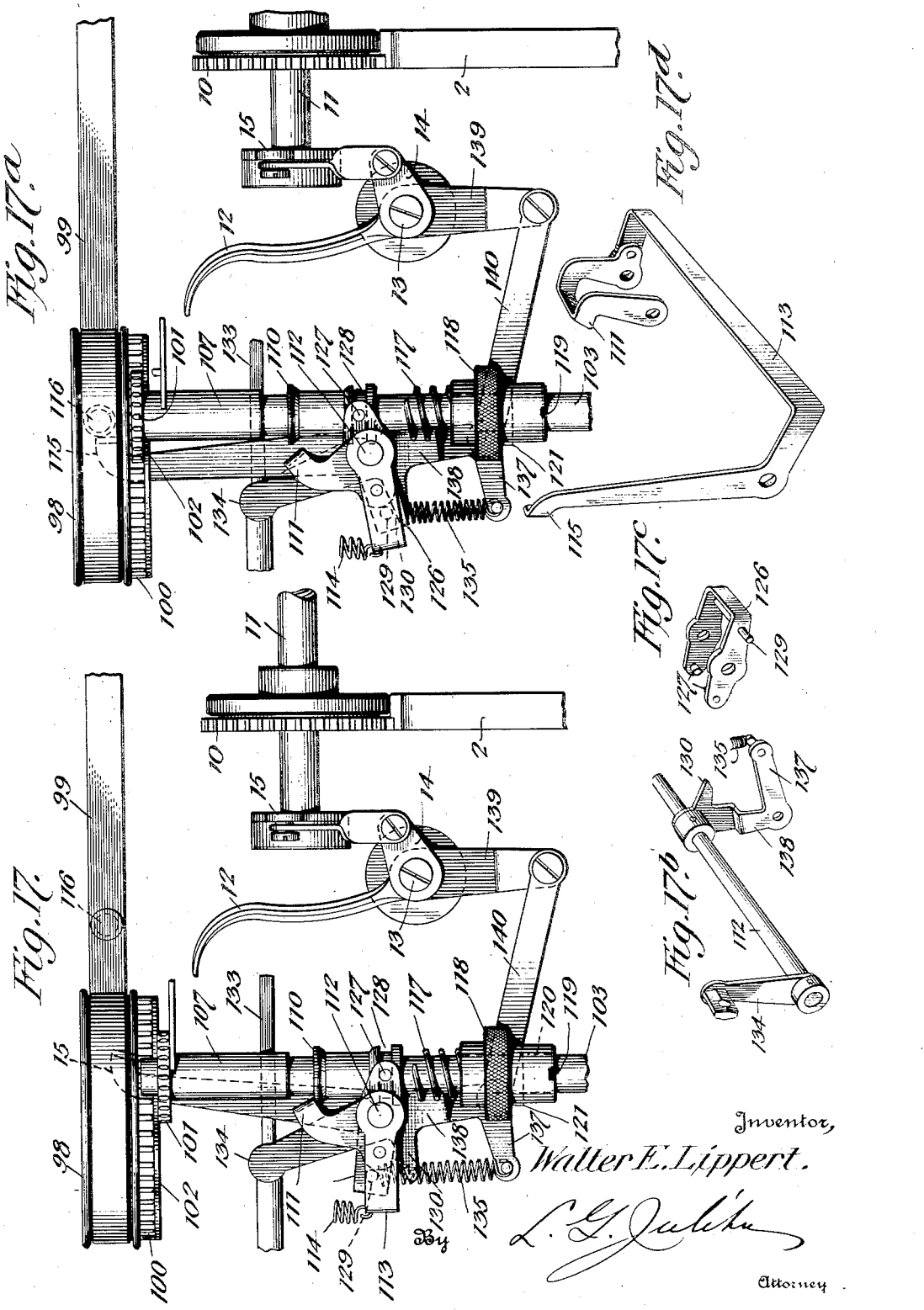

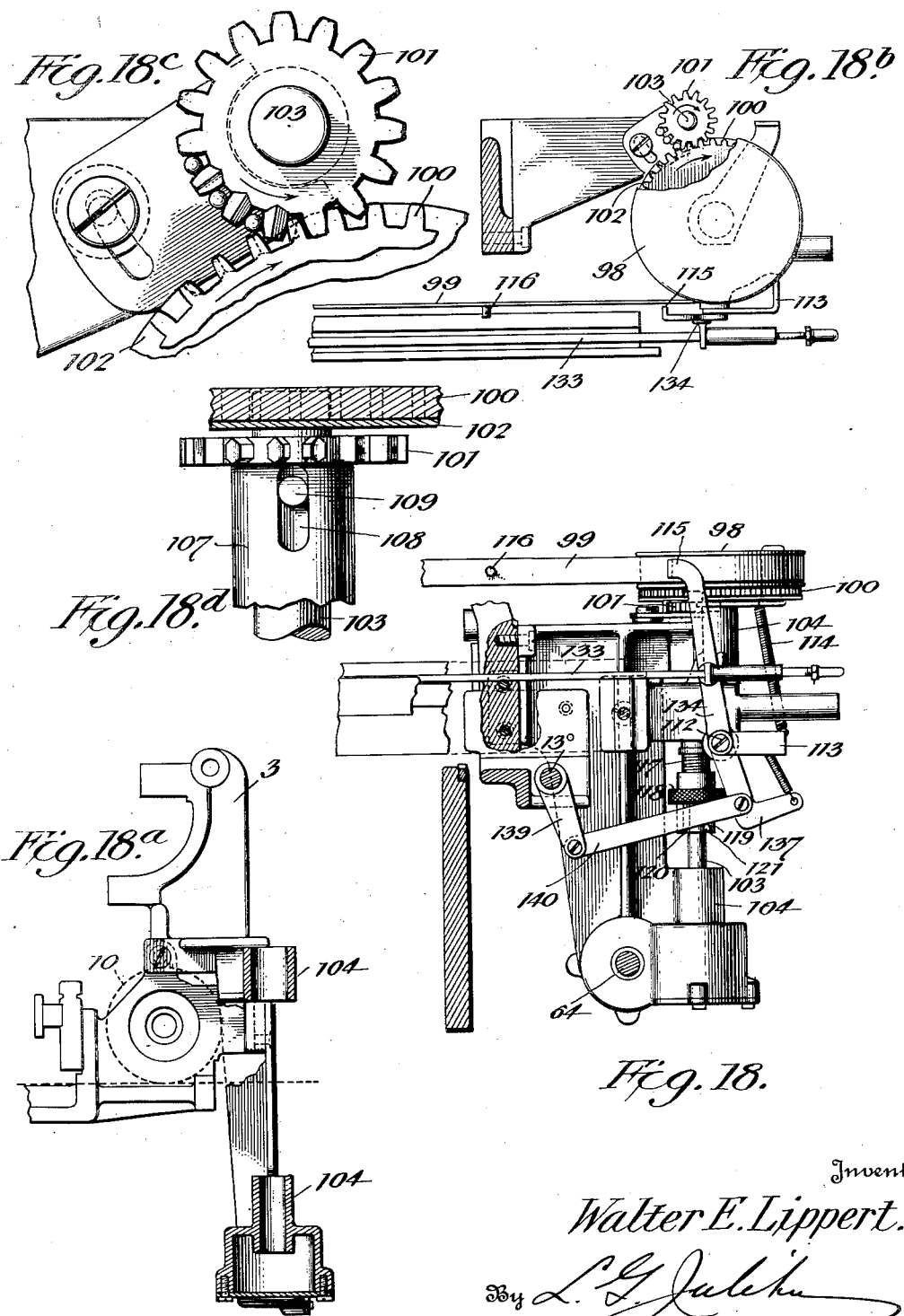

Nov. 1, 1932.  W. E. LIPPERT  1,885,525
PUBLIC SERVICE BILLING MACHINE
Filed March 25, 1927   21 Sheets-Sheet 19
Fig. 19.
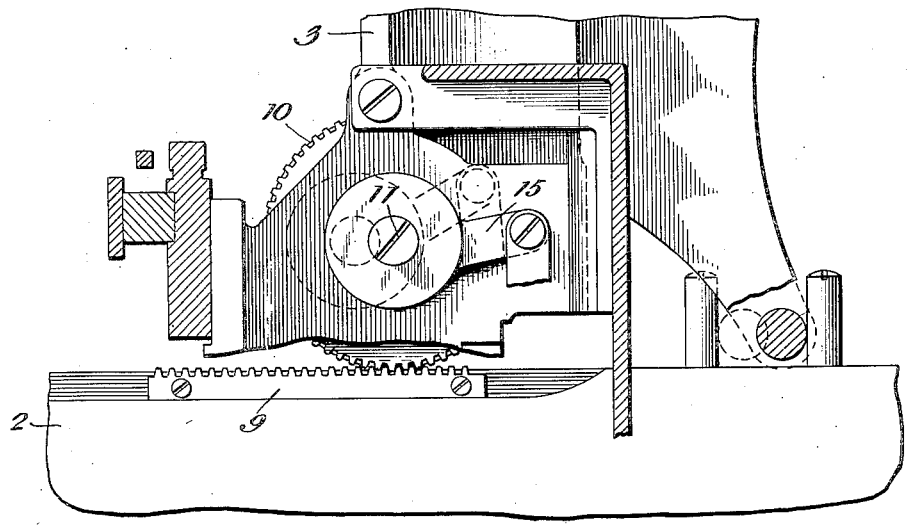
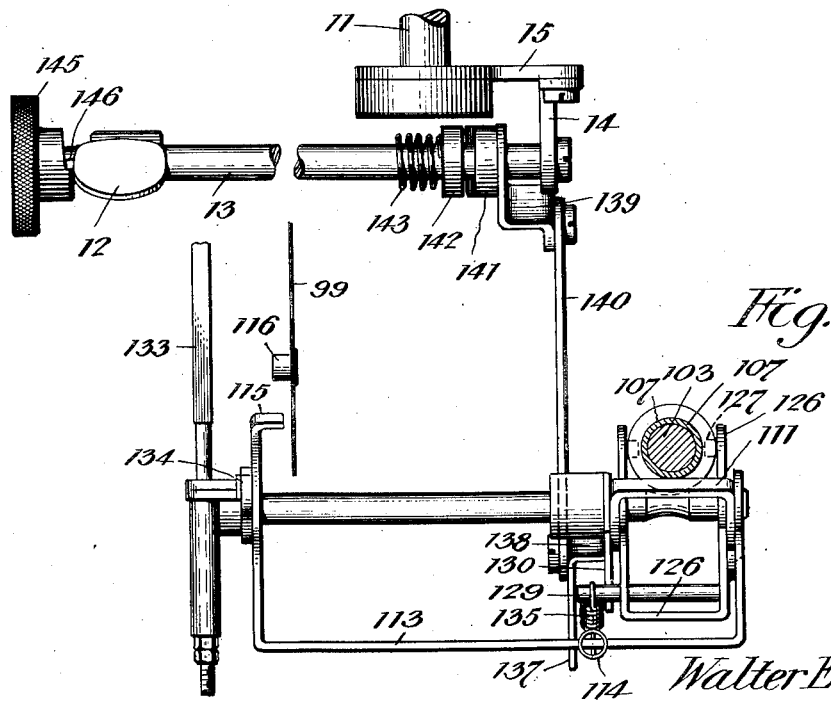
Fig. 19a.
Inventor,
Walter E. Lippert.
By L. G. Julihn
Attorney

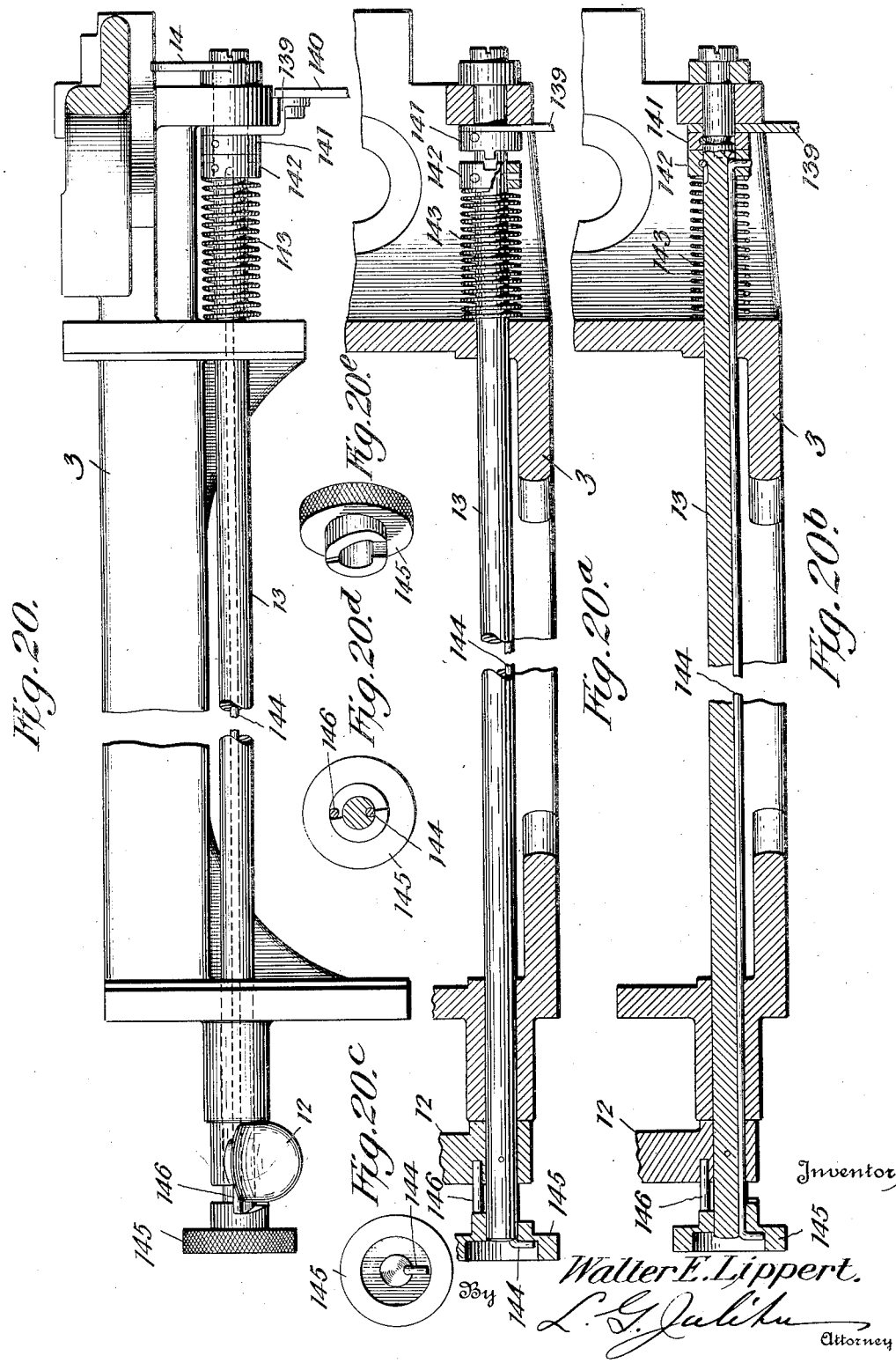

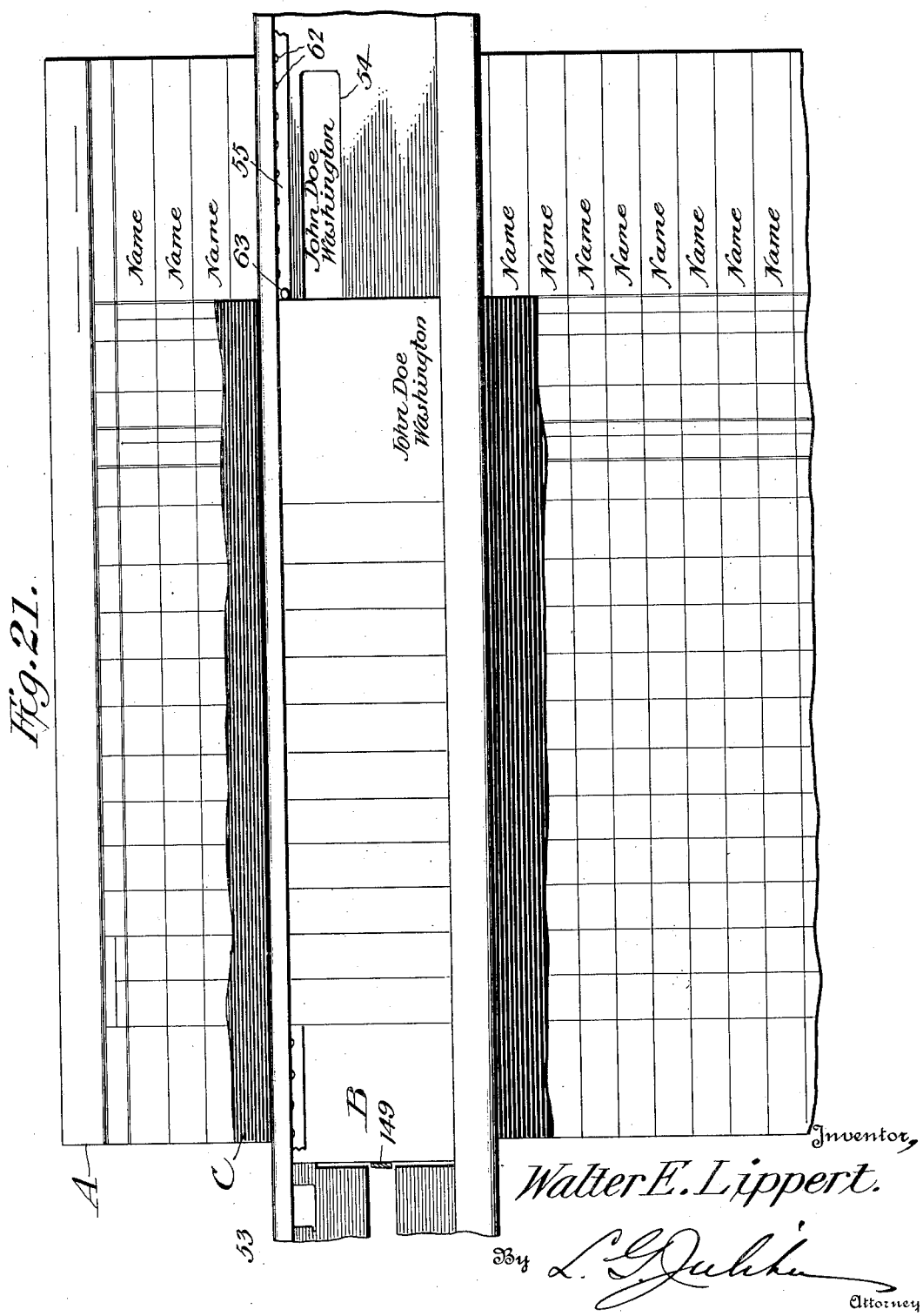

Patented Nov. 1, 1932

1,885,525

UNITED STATES PATENT OFFICE

WALTER E. LIPPERT, OF HARRISBURG, PENNSYLVANIA, ASSIGNOR TO ELLIOTT-FISHER COMPANY, OF HARRISBURG, PENNSYLVANIA, A CORPORATION OF DELAWARE

PUBLIC SERVICE BILLING MACHINE

Application filed March 25, 1927. Serial No. 178,393.

This invention relates to public service billing machines, designed to typewrite with speed and economy bills of public service corporations, and to effect certain mechanical computations automatically as the bills are written.

The object of the invention, stated generally, is to provide a machine of this type in which the feeding of the bills to and from the machine, as well as the feeding of a check or audit sheet and a carbon, will result automatically from the ordinary manipulation of the machine for the recording of the items.

A number of subordinate objects will appear as the description of the illustrated embodiment of the invention is hereinafter developed.

In the accompanying drawings:

Figure 1 is the front elevation of the machine.

Figure 1a is a detail sectional view of the treadle and associated parts.

Figure 2 is a rear elevation of the machine.

Figure 3 is a side elevation of the machine, with the feed hopper in section.

Figure 4 is a longitudinal sectional view of the machine with certain of the parts indicated diagrammatically.

Figure 5 is a transverse section on a line just in rear of the hoppers.

Figure 5a is a section through the platen frame, showing more particularly the proof sheet feed.

Figure 6 is a longitudinal section through the feed hopper and adjacent parts.

Figure 6a is an end view of the same.

Figure 6b is a detail sectional view of the feed gate.

Figure 7 is a plan view of the subject matter of Figure 6.

Figure 7a is a perspective view of the follower.

Figure 7b is a sectional view of the feed hopper, showing the follower elevating device.

Figure 8 is an enlarged sectional view showing the guide plate, with portions broken away, and the associated mechanism for feeding and stopping the bill.

Figure 9 is a side elevation of the platen frame, showing the receiving hopper.

Figure 9a is a perspective view of the adjustable end wall of the receiving hopper.

Figure 10 is a longitudinal section of the receiving hopper, and showing the tensioning device for the feed belt.

Figure 10a is a section on the line 10a—10a of Figure 10.

Figure 10b is a sectional view of the bill arresting spring in the bill guide.

Figure 10c is a plan thereof.

Figure 11 is a longitudinal section through the platen frame, showing the platen and associated parts in normal position.

Figure 11a is a similar view, with the platen depressed to facilitate back spacing.

Figure 12 is a sectional elevation showing more particularly the carbon mounting and feed.

Figure 12a is a detail sectional view of the mounting for the carbon roll shaft.

Figures 12b, 12c, and 12d are detail views of the carbon feed.

Figure 13 is a perspective view of the bill feeding and associated mechanisms.

Figure 14 is a side elevation, partly in section of the bill feed controlling mechanism.

Figure 14a is a rear elevation, partly in section, of the same.

Figure 14b is a detail view of the tension device.

Figure 15 is an elevation of the bill feed control, set for single line work, but in inoperative position.

Figure 15a is a similar view with the parts in operative position.

Figure 16 is a similar view of this mechanism, set for two line entries, but in normal inoperative position.

Figure 16a is a similar view, showing how the movement of the carriage fails to position the bill feed control when the end of the first line of writing is reached.

Figure 16b is a detail of parts shown in Figure 16.

Figure 17 is a similar view, showing how, in two line writing, the bill feed control is cocked by the operation of the line space mechanism to feed the machine from the first line to the front or second line.

Figure 17a is a view similar to Figure 17, showing how the advance of the carriage for the printing of the second line positions the bill feed control for the feeding of a new bill when the carriage is retracted upon the completion of the second line of writing.

Figure 17b, Figure 17c, and Figure 17d, are perspective views of details shown in Figure 17.

Figure 18 is a detail view of the bill feed clutch and associated parts.

Figure 18a is a sectional view of the bearing bracket for the pinion shaft.

Figure 18b is a detail view of the clutch and parts of the clutch control.

Figure 18c is an enlarged detail of the clutch pinion, and a portion of the driving gear of the bill feed.

Figure 18d is still another detail of the clutch pinion.

Figure 19 is a sectional elevation of the carriage frame showing a line space gear and pinion.

Figure 19a is a sectional elevation showing more particularly the line space clutch, and the relation of the line space mechanism to the bill feed control.

Figures 20 and 20a are sectional elevations showing the mounting and arrangement of the line space shaft, with its clutch engaged and disengaged.

Figure 20b is a complete longitudinal section of this subject matter.

Figures 20c, 20d and 20e are details of the structure shown in Figure 20.

Figure 21 is a plan view showing the relative arrangement of the proof sheet, carbon, and work sheets, after the work sheet has been fed to printing position.

The machine organization includes a pedestal 1, on which is mounted a platen frame 2, surmounted by a carriage frame 3, on which travels the carriage 4 of what is known as an Elliott-Fisher billing and bookkeeping machine. In this machine, the printing mechanism 5 strikes downwardly against the flat platen 6, which in the present instance is comparatively narrow, and carried by platen supporting arms 7, pivoted at 8 to the side walls of the platen frame. This comparatively narrow platen suffices for the character of billing now under consideration, because a single line of writing is ordinarily sufficient, and two lines constitute the maximum requirement.

This slight line space movement of the line space frame 3, longitudinally of the platen frame 2, is accommodated by comparatively short line space racks 9 on the fixed platen frame, engaged by line space gears 10 on the shaft 11, mounted on the frame 3 (see Fig. 19), and operated by a line space lever 12, extended from the line space shaft 13, having an arm 14 and a link connection with an arm 15, the oscillation of which advances or rotates the line space pinions 10 and advances the line space carriage 3.

The platen 6 is held in its elevated or operative position by springs 16, and its depression from the writing plane is provided for through the medium of a treadle 17, swung from a shaft 18 (see Fig. 1), and connected by a link 19 to a bell crank 20, which is also connected to a draw rod 21, the upper end of which is connected to the platen or its support. By depressing the treadle 17, the platen is swung down against the resistance of the springs 16, from the position shown in Figure 11 to that shown in Figure 11a. Normally, however, the platen 6 occupies an elevated position, and over it is lead from front to rear, a check sheet "A", which carries the names or other identifying data of the bills to be written. These bills "B" are fed longitudinally over the platen, that is, from side to side of the machine, and between the bill and the proof sheet is interposed a carbon "C", which like the proof sheet, is lead over the platen from front to rear.

Preferably, the proof sheet is in a loose roll 22, carried in a trough 23 at the front of the platen frame, and is carried back over a paper table 24 to the platen, and thence over an inclined support 25 to the rear of the machine. A pressure finger 26 preferably coacts with the support 25 to insure the movement of the check sheet in its proper path as it leaves the platen. The carbon "C" is lead from a carbon supply roll 27 at the front of the frame 2, and over guide bars or rolls 28 and 29, in front and in rear of the platen, and thence to a carbon receiving roll 30, mounted adjacent to the ear end of the platen frame, as shown in Figure 4.

In order to provide for a gradual rearward feed of the carbon, there is associated with the rear roll, a ratchet wheel 31, engaged by feed pawl 32,—retracted by a spring 33 against a bell crank 34, operated in a manner to be described, by the mechanism employed for feeding the bill. The bell crank 34 also serves to operate the feeding mechanism for the proof sheet. This mechanism (see Figs. 11 and 11a) includes on each side of the frame a vertically disposed lever 35, the upper end of which constitutes a clamping ledge 36, overlying the edge of the proof sheet and cooperating with a clamping lever 37 of bell crank form, pivoted on lever 35, and having such angular disposition, that it will be effective to grip the sheet when the lever 35 is swung in the proper direction to advance the proof sheet, while releasing the sheet upon the backward movement of the feed lever to its normal position. The clamping action of the lever 37 is rendered more certain by the provision of a second lever 38, mounted on the lever 35, and having a slot and pin connection 39 with the lever 37. The lever 38 is urged in one direction by a spring 40, to assist in the clamping action, but is not sufficiently strong to cause the feeding clamp to interfere with the proper retraction of the parts. It will be understood, of course, that the lever 35, and associated parts, except the link 41, by means of which one of these levers is connected to the bell crank 34, is duplicated at the opposite side of the machine, the two primary feed levers being mounted on the same shaft 42, which extends entirely across the platen frame.

It is sometimes desirable to back-space the proof sheet, for instance when the operator has inadvertently written a bill which does not correspond with the identifying data on the proof sheet. To accommodate this unusual condition, I provide back spacing mechanism for the proof sheet which is somewhat similar in construction to the feeding mechanism just described, but reversed in operation. A shaft 43, extending across the platen frame, is provided with feeding arms 44, having terminal clamping members 45, with which are associated small clamping levers or dogs 46, urged by springs 47 in a proper direction to secure the clamping action. The oscillation of this feeding mechanism to back-space the sheet, is effected by a handle 48, extended through a side wall of the frame from one of the levers 44, for convenient manipulation. The spring 49 serves to retract the back-space feeding mechanism, and may be connected to one of the levers 44 and to the platen support.

In order to back-space the proof sheet without disturbing the carbon, and without interference from the mechanism which normally advances the proof sheet, it is desirable before operating the back-spacing mechanism to depress the platen from the writing plane, and to release the forward feed clamp. We have already seen how the platen may be depressed by the operation of the treadle 17, and by reference to Figures 11 and 11a it will be seen that projections 50 on the platen support are so disposed that when the platen is moved down, contact will be made with the levers 38, which will be swung against the resistance of the springs 40 to move the clamping levers 37 to a completely inoperative position. The back-spacing mechanism may then be operated to back-space the proof sheet without possibility of interference, and upon the release of the treadle, the platen and the sheet advancing mechanism will be restored to normal position.

For the expeditious handling of the bills, two inclined hoppers 51 and 52 extend at a downward inclination from the opposite sides of the platen frame, in alignment with the platen. In the operation of the machine, the bills are stacked in what may be called the delivery hopper 51, from which they are automatically fed to the printing position over the platen. From this position they are removed and deposited in the receiving hopper 52, as an incident of the next operation of the feed to bring a new bill to the printing position.

Associated with the platen, is a bill guide 53 (see Fig. 8), in the form of a light metal frame, having its edges folded over to engage the edges of the bill, and its ends bent down to present the guide in close proximity to the upper ends of the hoppers. This bill guide is cut out opposite the active printing area of the platen 1, adjacent to its left hand end, and also has an elongated opening 54, through which is exposed the identifying data of a single bill, as such data is presented opposite this opening by the advance of the proof sheet.

The primary element of the bill feeding mechanism is a bill feeding tape 55, which is continuous, and is lead completely around the platen frame, and around the feed roll 56 at the upper end of the hopper 51 and a tension roll 57 at the upper end of the hopper 52. The tension roll 57 is carried by a tension lever 58, urged by a spring 59 in a proper direction to put the tape under the desired tension. The rolls 56 and 57 are located in a lower plane than the upper edge of the platen frame. This compels the upper run of the tape to assume an angular direction beyond the sides of the frame, substantially corresponding to the inclination of the two hoppers, and necessitates the mounting of guide rollers 60 for the tape at the upper edges of the frame sides, just in rear of the platen. Preferably the rollers 56 and 57 are provided with pins 61, engaging aperture 62 in the tape 55, and the tape is also provided with feeding studs 63, one of which engages the rear end of the bill to feed the latter to its printing position, after the bill has been delivered to the tape from the feed hopper.

The feed roll 56 for the tape (see Figs. 2 and 13), is mounted on a feed shaft 64, which also carries a feed roll 65, engaged by a presser roll 66, carried by a swinging yoke 67, urged in a direction to engage the rolls 65 and 66 by a spring 68. The rolls 65 and 66 are located just above the upper end of the hopper 51, in position to receive the advancing edge of a bill fed from the hopper 51 by hopper feed rolls 69 on a shaft 70.

The bills, stacked in the hopper 51 on the follower 71 (see Fig. 6), are urged against the rolls 69 by a lazy tong elevator 72, mounted below the follower and urged by a spring 73 to maintain the topmost bill of the stack against the rollers 69, and in the plane of the receiving end of the bill guide. The outer end wall 74 of the hopper 51, is adjustable to accommodate bills of different lengths, and is provided with a spring finger 75, engaging the rear or outer ends of the uppermost bills of the stack to urge said bills toward a gate 76, having a micrometer adjustment 77, and spaced from the middle roller 69 just sufficiently to allow the passage of a single sheet to the bill guide when the rolls 69 are operated. The tension roll 57 for the tape, is located just above the inner end of the receiving hopper 52, (see Fig. 10), said hopper having an adjustable lower end wall 78, and a swinging weight 79 which rises as the cards accumulate in the hopper.

The shaft 64 carries, in addition to the tape roll 56 and the feed roller 65, a gear 80 and a pinion 81. The gear 80 normally meshes with a pinion 82 fixed to rotate with the feed roll 66, so that when the yoke 67 is in its depressed position, the meshing of the gear 80 and the pinion 82 will cause the roll 66 to be positively rotated with the roller 65, but in a reverse direction. The feed shaft 64, driven in a manner to be presently described, is the primary feed shaft for the various devices of the bill feeding mechanism, as well as the feeding devices for the proof sheet and carbon. In order to drive the shaft 70 of the feed roll 69 from the shaft 64, the pinion 81 on said shaft engages and drives a gear 83, on what may be termed the cam shaft 84, and the gear is provided with a pin 86, which as the gear 83 rotates, engages the short operating arm 87 of a crank 88, fixed to a short shaft 89, provided at its opposite end with a segment 90, which engages and drives a pinion 91, loose on the shaft 70 of the feed roll 69, but having a pawl and ratchet connection 92 with said shaft. Crank 88 is also provided with a retracting arm 93 in addition to the operating arm 87, and by reference to Figures 8 and 13 of the drawings, the operation of this feed roll drive will be clearly apparent.

In the rotation of the gear 83, the pin 86 moves from the normal position shown in Figure 13, to the left hand dotted line position in Figure 8. During this movement, the crank 88 and the sector 90 are swung to drive the feed rolls 69 and advance the topmost bill to the feed rolls 65 and 66, which will engage and positively feed the bill, until it has sufficiently advanced to be engaged by one of the studs on the tape, which, as heretofore explained, will continue the advance of the bill toward the printing position after the bill has moved out of the range of the feed rolls. As the feed of the paper continues, by the rotation of the rolls 65 and 66, and after the operation of the roll 69, the pin 86 on the gear 83 will advance idly with the gear until it reaches the full line position in Figure 8. This will present the pin to the comparatively long retracting arm 93 of the crank 88, and during the final or succeeding movement of the bill feeding mechanism, the pin will return to normal position, and incidentally will restore or retract the crank 88 and the segment 90.

We have already seen that the feed of the carbon strip "C" and proof sheet "A" is effected by the swinging of the bell crank lever 34, and it has been stated that these feeds are driven from the shaft 64. This is accomplished by providing the cam shaft 84, (which as we have seen operates the segment 90), with a feed cam 94, operating a cam lever 95 (Figure 5), extended through one side wall of the platen frame (see Figs. 11 and 13), and connected by a link 96 to the horizontal arm of the bell crank 34. The cam 94 is provided with an eccentric adjustment (Figure 3), to facilitate the timing of the operation.

The operation of the bill, carbon, and proof sheet feeds, is naturally accomplished during the retraction of the carriage after the latter has been advanced to print the desired data on the bill. The carriage of the machine is commonly retracted by a motor 97, and since this retraction results in the backward rotation of the usual power barrel 98, connected to the carriage by a tape 99, the power barrel in addition to performing its usual function of advancing the carriage, is available as a driving means for the various feeding mechanisms during the return of the carriage to normal position. I therefore fix to the barrel 98, what may be termed a clutch gear 100, intermittently engaged by a clutch pinion 101, and provided with a guard plate 102, which prevents the pinion 101 from moving into engagement with the gear, except when the latter is positioned accurately for such engagement. A vertical clutch shaft 103 is mounted to rotate in suitable bearings 104, and is provided at its lower end with a worm gear 105, engaging a similar gear 106 at the rear end of the shaft 64. The shaft 103 carries the clutch pinion 101, which while slidable thereon to engage the gear 100, is rotatable therewith. Consequently, if such gear and pinion are in mesh, it will be seen that the rotation of the gear by the retraction of the carriage will cause the primary feed shaft 64 to rotate for the purpose of feeding the bill, carbon, and proof sheet through the mechanisms driven from the shaft 64, as already described. By reference to Figures 14 and 14a, it will be seen that the pinion 101 is fixed to the upper end of the sleeve 107, having slots 108 for the reception of pins 109, extended from the shaft 103 to compel rotation of the sleeve with the shaft, while permitting sufficient longitudinal movement of the sleeve on the shaft to engage and disengage the clutch.

The sleeve 107 is also provided with an annular ledge 110, engaged by a swinging clutch lock 111, mounted to swing from a shaft 112, and fixed to a bail 113, urged in a direction to lock the clutch by a spring 114, and having a vertically disposed arm 115, the upper end of which is disposed in the path of a clutch releasing lug 116, extended from the power tape 99 (see Fig. 13), to swing the arm 115, the bail 113, and the lock 111 against the resistance of the spring 114, for the purpose of releasing the clutch lock to permit the engagement of the clutch as the carriage reaches the limit of its forward movement. Obviously this will position the parts for the operation of the various feeding mechanisms when the carriage is moved in the opposite direction.

To cause the engagement of the clutch, when the lock 111 is thrown back, a clutch engaging spring 117 is coiled upon the shaft within the tension member 118, and acts to elevate the sleeve 107 and thus move the pinion 101 into gear 100, when the lock 111 is swung back from the ledge 110.

For a purpose to be described, the tension member 118 is movable to two positions on the shaft 103, the purpose being either to hold the spring 117 under tension for the operation of the clutch, or to release the tension and render the spring ineffective. To secure this adjustment of the tension member, it is provided with shallow notches 119, and somewhat deeper notches 120, either of which by the rotation of the tension member, may be brought opposite a pin 121, extended through the shaft 103. When the pin engages the shallow notches, the spring is under tension, but by a partial rotation of the tension member, the pin may be brought opposite the deep notches, so that the tension member will drop to a position in which the spring will not be under sufficient tension to operate the clutch.

It will be obvious from what has been said, that if the parts are positioned as indicated in Figures 14 and 14a, which is their normal position during the writing of a line, the advance of the carriage will finally bring the stud 116 into engagement with the arm 115, and will swing the latter from the position indicated in Figure 14a to the position indicated in the Figure 15a. This will swing the bail 113, and with it the lock 111, thus withdrawing the latter from the sleeve 107, and permitting the rise of the sleeve, under the impulse of the spring 117, to move the clutch pinion 101 into the gear 100. If the carriage of the machine is now retracted, its pull on the power tape will rewind the spring drum, which has previously advanced the carriage, and incidentally will rotate the gear 100 to drive the pinion 101, the shaft 103, the primary feed shaft 64, and the various feeding mechanisms connected with the latter. To inaugurate the retraction of the carriage, the latter is equipped with a motor key 122, which swings an arm 123 to rock in a forward direction a motor bail 124, and thus bring into action the carriage return motor 97, in the manner disclosed in the copending application, No. 135,210 of H. A. Foothorap. In the Foothorap construction, however, the arm 123 may engage the control bail at any point in a wide range of movement of the carriage. In the machine of this application, however, it is desired to prevent the retraction of the carriage until it has advanced sufficiently to operate the clutch mechanism just described. Therefore the arm 123 is shortened so that it will clear the motor bail if the motor key is operated in any position of the carriage except that determined by the location of a control lug 125 lengthwise of the motor bail 124 (see Fig. 13). When the carriage has moved sufficiently, as heretofore described, to operate the arm 115 and connect up the clutch, the arm 123 will be located behind lug 125, and the depression of the motor key will rock the motor bail and thus inaugurate the retraction of the carriage by the motor.

Obviously, when the carriage has been fully retracted, and the various feeds have been operated to remove the completed bill, to place a blank bill in the printing position, to advance the proof sheet, and to feed the carbon, the clutch mechanism must be disconnected to place the feeding mechanism out of action. To accomplish this automatically, a clutch shifter 126 is mounted to swing loosely on the shaft 112, and is provided with lugs 127, engaging an annular groove 128 in the sleeve 107. Extended from the shifter 126, is a pin 129, which overlies a shifter operating arm 130 (see Figs. 14a and 19a), fixed to the shaft 112, so that when the clutch is in the engaging position shown in Figure 15a, the rocking of the shaft 112 will cause the arm 130, by engagement with the pin 129, to swing the shifter 126 from the position shown in Figure 15a to that shown in Figure 15, thus drawing down the sleeve 107 against the tension of the spring 117, removing the pinion 101 from the gear 100, and allowing the clutch lock 111 to re-engage and hold the retracted clutch. The rocking of the shaft 112 to effect the unclutching, as described, is accomplished by the carriage as it reaches the limit of its retracting movement, at which time a hook 131, movable with the carriage, will engage a projection 132, adjustably carried by a draw rod 133, connected at its rear end to a clutch releasing arm 134, by a connection which permits limited relative movement of the arm and rod. The arm 134 is normally located at the rearward or left hand limit of its movement by a spring 135, connected at its upper end to the pin 129, and at its lower end to the angular extension 137 of an arm 138, fixed to and depending from the shaft 112.

When, however, the clutch moves up, as shown in Figure 15a, a corresponding swinging movement of the clutch shifter 126 will cause the pin 129 thereon, to depress the arm 130, and thus rock the shaft 112 to move the arm 134, from the normal position shown in Figure 15, to the position shown in Figure 15a. Therefore it will be evident, assuming the parts to be in positions shown in Figure 15a, that the carriage retraction will finally engage the hook 131 with the draw rod 133, thus drawing the latter in the direction of the arrow in Figure 15a, and swinging the arm 134 to rock the shaft 112 and cause the operating arm 130 to swing the shifter 126, for the purpose of unsetting the clutch.

The carriage may now be advanced to write a bill, after which it will automatically throw in the clutch, in the manner described, and upon the retraction of the carriage, will operate the feed mechanism and finally disconnect the feed after the bill, proof sheet and carbon have been positioned for the next billing operation.

For the printing of two line bills, it is obvious that some variation of the described operation is necessary, because no operation of the feeds must take place after the printing of the first line. Otherwise the bill would be prematurely displaced, and the proof sheet prematurely advanced. It is to provide for this contingency, that the tension device 118, movable to place the spring 117 out of action, is provided. This is done when beginning two-line billing, and the result is that when the carriage advances at the end of the first line, and withdraws clutch lock 111 from the sleeve, there is no power with which to move the clutch into engagement, and there is no operation of the feeding mechanism when the carriage is retracted. When the carriage again moves forward to print the second line, the automatic clutching and feeding must be resumed, because the bill will then have been completed, and should be then replaced by another bill during this second or final retraction of the carriage from the two-line bill operation.

To meet these requirements, the tension device 118 is first shifted to its depressed position, and after the carriage has been retracted from the first line of writing, the line spacing mechanism of the machine is operated to advance the machine forward one line space, and to place the clutch under tension, so that it will be engaged when the carriage comes forward after writing the second line of the bill.

To accomplish this tensioning of the clutch by the operation of the line space mechanism, an arm 139 is swung loosely from the line space shaft 13, and is connected by a link 140 with the arm 138, which is fixed to the shaft 112, and to an extension 137 of which the spring 135 is connected. The arm 139 is equipped with a clutch member 141, engaged by a clutch member 142, urged in the direction of its engagement by a spring 143. To the clutch member 142 is attached one end of a clutch rod 144, accommodated in a longitudinal groove in the shaft 13 (see Figs. 20 to 20b, and Fig. 13), and connected at its front end with a clutch setting cam 145, coacting with a pin 146. The cam member 145 is thus located at the front end of the line space shaft, and may be turned on the shaft for the purpose of disconnecting the clutch 142, for single line billing, or of causing the connection of the clutch when two-line billing is to be done.

Now by comparing Figures 16 and 17, it will be seen that after the first line is written, the operator, by operating the line space lever 12, will line space the carriage frame in the usual manner, and at the same time will swing the arm 139, the arm 138, and the extension 137 of the latter, to place the spring 135 under tension. This will result because the pin 129, to which the upper end of the spring is connected, is held in fixed position by the lock 111, which is holding the clutch sleeve down. We now have a substitute for the clutch operating spring 117, which has been put out of action. This substitute for the spring 117, has now been put under such tension by the operation of the line spacing mechanism, that, when the carriage now comes forward at the end of the second line of writing, and unlocks the clutch by swinging the lever 115, the spring 135 will elevate the clutch pinion 101, and position the parts for an operation of the feeding mechanism when the carriage is now retracted.

The operation of the line spacing mechanism, however, has done more than merely stretch the spring 135, and thus set or cock the clutch control for subsequent operations by the carriage. It has also, as an incident of this swinging of the arm 138 to tension the spring, rocked the shaft 112 to shift the arm 134 to the right, in Figure 13. As a consequence of this, the carriage, when it reaches the limit of its retraction and operates the draw rod 133, will perform two distinct functions. One of these is its normal function, which is the operation of the shifter 126 to disengage the clutch, and the other is the automatic retraction of the machine to the first line position, because the connections, including the clutch 142, which have resulted in the swinging of the arm 134 when the line space lever 12 is operated, will effect a reversal of the operation, and thus oscillate the line space shaft 13 to back space the machine when the arm 134 is operated by the carriage to disconnect the primary clutch 101. It will be seen, therefore, that in two-line writing, the various feeding mechanisms are not brought into action at the completion of the first line of writing; that the operation of the line spacing mechanism to advance the machine to the second line of writing, sets the clutch mechanism for action; that the advance of the carriage after completing the second line of writing, connects up the feeding mechanism for operation during the second retraction of the carriage; and that the second retraction of the carriage, in addition to operating the feeds, automatically disconnects the feeding mechanism from the carriage, and automatically back spaces the machine to the first line of writing.

To insure the accurate location of the bill as it is moved swiftly to the printing position, the bill guide is provided with a bill retarding spring 147 (see Figs. 10b and 10c). On the frame 3 is mounted a bill stop or work gauge 148, in the form of a spring, having a downturned end 149, which normally occupies an elevated position as shown in Figure 8. At the proper time, this work gauge is moved down to accurately arrest and position the bill by a gauge depressing cam 150, mounted on and movable with the carriage.

The shaft 64 (Figure 3) is in three sections, the middle section being connected to the rear section by a coupling 151, and to the front section by a slip joint 152. The slip joint permits line space movement of the carriage frame, and the coupling facilitates the disconnection of the two units of the mechanism, which are carried respectively by the carriage frame and the platen frame. By loosening the coupling, the carriage frame and all parts assembled therewith, can be readily removed from the platen frame, or tilted back on the platen frame to facilitate access to various parts of the machine.

As already stated, the Elliott-Fisher billing and bookkeeping machine, which I have shown modified in accordance with my invention, is arranged to effect certain mechanical computations for accumulating, proving, and otherwise indicating certain results with respect to the items printed. Great flexibility in the arrangement of the computing mechanism is possible, and likewise, the mechanism as modified by me may be employed for a wide range of billing uses.

The machine, however, is especially designed and adapted for public service billing, and I have therefore shown the machine equipped with a series of registers "R", of well known type, the usual cross-footer register, "X", and a number of state control devices "S", which govern the character of the operation of the cross-footer during the printing of various items. Since this arrangement is necessarily changed to accommodate the particular billing operation to be performed, no detailed discussion of the computing mechanism is thought to be necessary.

It is believed that from the foregoing, the construction and operation of the machine will be clearly understood, but I wish to reserve the right to effect such further modifications and variations of the illustrated structure as may come fairly within the scope of the appended claims.

What I claim is:

1. In a billing machine, the combination with a platen and a carriage, of a pair of bill receiving hoppers mounted upon opposite sides of the platen, and mechanism controlled by movement of the carriage and automatically feeding a bill from one hopper onto the platen and from the platen into the other hopper.

2. In a machine of the class described, the combination with a platen and printing mechanism, of hoppers located at opposite ends of the platen, a work guide extended between the hoppers, an endless work feeding tape associated with the guide, means for feeding the work from one of the hoppers to the tape, and common-driving means for the tape and feeding means.

3. In a machine of the class described, the combination with a platen and printing mechanism, of a hopper, a work guide associated with the platen and hopper, an endless work feeding tape associated with the guide, work feeding means interposed between the tape and the hopper to feed the work to the tape, and means for advancing the work from the hopper to the feeding means.

4. In a machine of the class described, the combination with a platen and printing mechanism, of a work guide, associated with the platen, an endless feed tape, a hopper, work feeding means located between the platen and the hopper to feed the work into position to be engaged by the tape, and a feed roll engaging the work in the hopper, and operative to advance the work one sheet at a time to the feeding means.

5. In a machine of the class described, the combination with a platen and printing mechanism, of a hopper, a feed roll associated therewith, an oscillatory segment for driving the feed roll, said segment having operating and retracting arms, and a rotary member having a pin engaging said arms in succession, to operate and retract the segment.

6. In a machine of the class described, the combination with a platen and printing mechanism, of a work guide associated with the platen, an endless feed tape associated with the guide, and having widely separated work engaging studs, and means for feeding a work sheet edgewise onto the tape in timed relation to the travel of the tape to present the rear edge thereof in position to be engaged by a stud.

7. In a machine of the class described, the combination with a platen and printing mechanism, of a hopper, a work guide associated with the platen and hopper, an endless work feeding tape associated with the guide, and having widely separated studs, and means for feeding a work sheet from the hopper to the guide in advance of a stud of the tape and in the direction of movement of the latter.

8. In a machine of the class described, the combination with a platen and printing mechanism, of hoppers located beyond opposite ends of the platen, a work guide extended along the platen from one hopper to the other, an endless work feeding tape mounted wholly between the hoppers, a feed roll and a tension roll cooperating with the tape and located adjacent to the respective hoppers, and means for feeding the work from one hopper to the tape, to be fed thereby to the platen, and subsequently delivered to the other hopper.

9. In a machine of the class described, the combination with a platen and printing mechanism, of a work guide associated with the platen to guide the work in its movement thereover, and feeding mechanism for simultaneously feeding the work and also feeding a proof sheet at an angle to the direction of feed of the work.

10. In a machine of the class described, the combination with a platen frame and platen, of feeding mechanism for simultaneously feeding the work, and also feeding proof and carbon sheets, respectively, at an angle to the direction of feed of the work.

11. In a machine of the class described, the combination with a carriage and a platen, of means for feeding the work over the platen in one direction, means for feeding a proof sheet over the platen in a different direction, and common driving means for both of said feeding means operated by movement of said carriage.

12. In a machine of the class described, the combination with a carriage, power carriage return mechanism, and a platen, of means operative to advance a work sheet in one direction over the platen, and to advance a proof sheet and the carbon sheet in another direction over the platen, said means being rendered operative by return movement of its carriage.

13. In a machine of the class described, the combination with a platen frame and a platen, of a work guide disposed longitudinally of the platen, means for supporting and guiding a proof sheet disposed transversely of the platen, feeding means for the proof sheet, and means for back-spacing the proof sheet.

14. In a machine of the class described, the combination with a platen frame and a depressible platen thereon, of means for supporting and guiding a proof sheet, means for feeding the proof sheet, means for back-spacing the proof sheet, and means whereby the depression of the platen will render the feeding means inoperative to obstruct the back-spacing movement of the proof sheet.

15. In a machine of the class described, the combination with a platen frame and a depressible platen, means for feeding and guiding a work sheet and a proof sheet over the platen in angularly related paths, and means for depressing the platen.

16. In a machine of the class described, the combination with a platen frame and a depressible platen, of means for supporting and guiding a work sheet and a proof sheet in angularly related paths, feeding mechanism and back-spacing mechanism for the proof sheet, means whereby the depression of the platen will render the feeding means inoperative to obstruct the back-spacing of the proof sheet, and means for depressing the platen.

17. In a machine of the class described, the combination with a platen and printing mechanism, relatively movable longitudinally of the lines of writing, and means for feeding the work to the platen by such relative movement of the platen and printing mechanism.

18. In a machine of the class described, the combination with a platen and printing mechanism, and a carriage having retracting movement longitudinally of the lines of writing, of means whereby such movement of the carriage will feed a work sheet off the platen and another thereon.

19. In a machine of the class described, the combination with a platen, printing mechanism and a travelling carriage, of work feeding means, and means whereby movement of the carriage in one direction will connect the feeding means to the carriage for operation by the carriage when moved in the opposite direction.

20. In a machine of the class described, the combination with a platen, printing mechanism and carriage, of means for feeding the work, a motor for operating the feeding means, and means whereby the carriage will control the operation of the feeding means by the motor.

21. In a machine of the class described, the combination with a platen, printing mechanism and a carriage, of a power barrel for the carriage, and work feeding means automatically connected to the power barrel by movement of the carriage.

22. In a machine of the class described, the combination with a platen, printing mechanism and a carriage, of work feeding mechanism, a clutch controlling the operation of the work feeding mechanism, means for causing the movement of the carriage in one direction to engage the clutch, and means whereby the movement of the carriage in the opposite direction will operate the feeding means.

23. In a machine of the class described, the combination with a platen, printing mechanism and a carriage, of work feeding mechanism, a clutch controlling the operation of the work feeding mechanism, means for causing the movement of the carriage in one direction to engage the clutch, means whereby the movement of the carriage in the opposite direction will operate the feeding means, and a selective device for determining whether the carriage shall or shall not cause the engagement of the clutch.

24. In a machine of the class described, the combination with a platen, printing mechanism and a carriage, of a line spacing mechanism, work feeding mechanism, and means operated by the line spacing mechanism to bring the work feeding mechanism under the control of the carriage.

25. In a machine of the class described, the combination with a platen, printing mechanism and a carriage, of line spacing mechanism, work feeding mechanism under the control of the carriage, means for destroying the control of the work feeding mechanism by the carriage, and separate means for restoring such control.

26. In a machine of the class described, the combination with a platen, printing mechanism and a carriage, of line spacing mechanism, work feeding mechanism under the control of the carriage, means for destroying the control of the work feeding mechanism by the carriage, and separate means for restoring such control, said restoring means being operated by the line spacing mechanism.

27. In a machine of the class described, the combination with a platen, printing mechanism and a carriage, of line spacing mechanism, work feeding mechanism under the control of the carriage, means for destroying the control of the work feeding mechanism by the carriage, and separate means for restoring such control, said restoring means being operated by the line spacing mechanism, and settable means for determining whether the operation of the line spacing mechanism shall restore the control of the work feeding mechanism by the carriage.

28. In a machine of the class described, the combination with a platen, printing mechanism and a carriage, of separate feeding devices for feeding separate sheets over the platen, and means whereby the operation of said feeding devices will be controlled by the carriage.

29. In a machine of the class described, the combination with a platen, printing mechanism and a carriage, of separate feeding devices for feeding separate sheets over the platen, and means whereby the operation of said feeding devices will be effected by the carriage.

30. In a machine of the class described, the combination with a platen, printing mechanism, and a carriage, of separate feeding devices for feeding separate sheets over the platen, and means whereby the retraction of the carriage will operate said feeding devices.

31. In a machine of the class described, the combination with a platen, printing mechanism and a carriage, of separate feeding devices, a motor for operating said devices, and means including the carriage, for controlling the operation of the feeding devices by the motor.

32. In a machine of the class described, the combination with a platen, printing mechanism and a carriage, of carriage controlled means for feeding separate sheets over the platen in different directions.

33. In a machine of the class described, the combination with a platen, printing mechanism and a carriage, of carriage operated means for feeding separate sheets over the platen in different directions.

34. In a machine of the class described, the combination with a platen, printing mechanism and a carriage, of means controlled by the carriage for feeding successive work sheets to the platen, and for advancing a proof sheet step by step.

35. In a machine of the class described, the combination with a platen, printing mechanism and a carriage, of work feeding means, proof sheet feeding means, and carbon feeding means, all of said feeding means being controlled by the carriage.

36. In a machine of the class described, the combination with a platen, printing mechanism and a carriage, of work feeding means, proof sheet feeding means, and carbon feeding means, all of said feeding means being operated by the carriage.

37. In a machine of the class described, the combination with a platen, printing mechanism and a carriage, of work feeding means, proof sheet feeding means, and carbon feeding means, all of said feeding means being operated by the retraction of the carriage.

38. In a machine of the class described, the combination with a platen, a carriage and a carriage propelling motor, of work feeding mechanism, including a clutch, and a clutch lock operated by said motor.

39. In a machine of the class described, the combination with a platen, a carriage, and a carriage advancing motor, of work feeding mechanism, including a clutch, and a clutch lock operated by said motor during advance movement of the carriage.

40. In a machine of the class described, the combination with a platen, printing mechanism and a carriage, of a power barrel and tape for said carriage, work feeding mechanism, including a clutch, a clutch lock, and means movable with the tape to operate the lock.

41. In a machine of the class described, the combination with a platen, printing mechanism and a carriage, of work feeding mechanism, including a clutch, a clutch lock operative to permit the engagement of the clutch, and a settable device for determining whether the clutch engagement shall occur upon the operation of the lock.

42. In a machine of the class described, the combination with a platen, printing mechanism and a carriage, of feeding mechanism, including a clutch, and a clutch shifter and clutch lock, operated by movement of the carriage in different directions respectively.

43. In a machine of the class described, the combination with a platen, printing mechanism and a carriage, of work feeding mechanism, including a clutch, a clutch lock operated by the movement of the carriage in an advancing direction, and a clutch shifter operated by the movement of the carriage in a retracting direction.

44. In a machine of the class described, the combination with a platen, printing mechanism and a carriage, of feeding mechanism, including a clutch, a power barrel and tape through which the feeding mechanism is operated when the clutch is engaged, a clutch lock operated by the tape, a clutch shifter, a draw bar connected to the shifter, and means movable with the carriage to operate the draw bar.

45. In a machine of the class described, the combination with a platen, printing mechanism and carriage, of a feeding mechanism, a motor driving the feeding mechanism, a motor controlling key moving with the carriage, and means whereby the motor key will be effectively operative only after the carriage has reached a pre-determined position.

46. In a machine of the class described the combination with a platen, printing mechanism and a carriage, of feeding mechanism including a motor, a clutch, a clutch lock for preventing engagement of the clutch and unlocked by movement of the carriage, means for automatically engaging said clutch coincidentally with the unlocking of said lock, and a motor controlling device rendered operative by the unlocking movement of the carriage, whereby said device is effectively operative only after engagement of said clutch.

47. In a machine of the class described, the combination with a platen, printing mechanism and carriage, of a work guide associated with the platen, means for feeding the work through the guide, and a work gauge intermittently operated to arrest the work and by the retraction of the carriage longitudinally of the lines of writing.

48. In a billing machine, the combination with a platen and a carriage, of a pair of bill receiving hoppers mounted upon opposite sides of and below the platen, and mechanism controlled by movement of the carriage and automatically feeding a bill from one hopper onto the platen and from the platen to the other hopper.

49. In a billing machine, the combination with a platen and printing mechanism, of a pair of bill receiving hoppers mounted at opposite sides of and below the platen and inclined upwardly toward their respective side of the platen, and mechanism for automatically feeding a bill from one hopper onto the platen and from the platen into the other hopper.

50. In a billing machine, the combination with a platen, of a pair of bill receiving hoppers mounted at opposite sides of and below the platen and inclined upwardly toward their respective side of the platen, an endless conveyor for transporting bills over the platen from one hopper to the other, said conveyor being inclined intermediate said sides of the platen and the hoppers, and means for driving the endless conveyor.

51. In a billing machine, the combination with a platen, of a pair of bill receiving hoppers mounted at opposite sides of and below the platen and inclined upwardly toward their respective sides of the platen, an endless conveyor for transporting bills over the platen from one hopper to the other, said conveyor being inclined intermediate the sides of the platen and the hoppers, mechanism for feeding a bill from one hopper onto the conveyor, and mechanism for driving the conveyor.

52. In a billing machine, the combination with a platen, of a pair of bill receiving hoppers mounted at opposite sides of and below the platen, an endless conveyor for transporting bills over the platen from one hopper to the other and inclined upwardly intermediate the hoppers and the platen, mechanism for feeding a bill from one hopper onto the conveyor, and mechanism for driving the conveyor.

53. In a billing machine, the combination with a platen, of a pair of bill receiving hoppers mounted at opposite sides of and below the platen, an endless conveyor extending between the tops of the hoppers and over the platen and inclined upwardly intermediate the hoppers and the platen, and mechanism for elevating a bill in one hopper to a position above the adjacent intermediate portion of the conveyor and for feeding the bill edgewise onto the conveyor.

54. In a machine of the class described, the combination with a platen, a carriage, and a carriage propelling power barrel, of work feeding mechanism operated by rotation of said power barrel and feeding separate work sheets across the platen in relatively angular directions.

55. In a machine of the class described, the combination with a platen, a carriage, and a carriage feeding power barrel, of work feeding mechanism operated by rotation of the power barrel, and means for automatically connecting or disconnecting said mechanism and controlled by the position of the carriage.

56. In a machine of the class described, the combination with a platen, a carriage, and a carriage propelling motor, of work feeding mechanism including control devices operated by movement of the carriage, and a motor controlling key operative only after operation of said controlling devices.

57. In a machine of the class described, the combination with a platen, a carriage, and a carriage propelling motor, of work feeding mechanism including control devices operated by movement of the carriage, and a motor controlling key moving with the carriage and operative only after operation of said controlling devices.

58. In a machine of the class described, the combination with a platen, printing mechanism and a carriage, of line spacing mechanism, work feeding mechanism under the control of the carriage, means for destroying the control of the work feeding mechanism by the carriage, and means set by the line spacing mechanism for destroying such control and operating to reverse the line spacing mechanism.

59. In a machine of the class described, the combination with a platen and carriage, said carriage being movable in line and letter space directions respectively, of a work gauge rendered operative by movement of the carriage in one direction and retained in operative position by said carriage during movement thereof in the other direction.

60. In a machine of the class described the combination with a platen and carriage, said carriage having an advancing and a retracting movement longitudinally of the line of writing, of a carriage operated work gauge retained in operative position during movement of the carriage in both directions.

61. In a machine of the class described, the combination with a platen, printing mechanism and a carriage, of two carriage propelling motors driving the carriage in different directions, respectively, one of said motors reversing movement of the other, and work feeding mechanism operated by such reverse movement of said other motor and transporting the work across the platen in a flat spread out condition.

62. In a machine of the class described, the combination with printing mechanism and a carriage, of two carriage propelling motors operating the carriage in different directions respectively, one of said motors reversing movement of the other, and work feeding mechanism operated by such reverse movement of said other motor and including control mechanism operated by forward movement of said other motor.

63. In a machine of the class described, the combination with a platen and printing mechanism, of mechanism for simultaneously feeding the work, and also feeding a proof sheet at an angle to the direction of feed of the work.

64. In a machine of the class described, the combination with a flat platen and a carriage movable thereover, of carriage controlled means for ejecting the work from the platen.

65. In a machine of the class described, the combination with a flat platen and a carriage movable thereover, of carriage operated mechanism for effecting a work sheet from the platen and feeding another thereto.

In testimony whereof I affix my signature.
WALTER E. LIPPERT.